United States Patent
Altman

(10) Patent No.: US 12,197,209 B2
(45) Date of Patent: Jan. 14, 2025

(54) DEVICE, SYSTEM, AND METHOD OF AUTONOMOUS DRIVING AND TELE-OPERATED VEHICLES

(71) Applicant: DRIVEU TECH LTD., Kfar Saba (IL)

(72) Inventor: Baruch Yosef Altman, Pardes Hanna (IL)

(73) Assignee: DRIVEU TECH LTD., Kfar Saba (IL)

( * ) Notice: Subject to any disclaimer, the term of this patent is extended or adjusted under 35 U.S.C. 154(b) by 872 days.

(21) Appl. No.: 16/981,313

(22) PCT Filed: Mar. 17, 2019

(86) PCT No.: PCT/IL2019/050295
§ 371 (c)(1),
(2) Date: Sep. 16, 2020

(87) PCT Pub. No.: WO2019/180700
PCT Pub. Date: Sep. 26, 2019

(65) Prior Publication Data
US 2021/0116907 A1 Apr. 22, 2021

Related U.S. Application Data

(60) Provisional application No. 62/644,510, filed on Mar. 18, 2018.

(51) Int. Cl.
*G05D 1/00* (2024.01)
*B60W 30/16* (2020.01)
(Continued)

(52) U.S. Cl.
CPC .......... *G05D 1/0038* (2013.01); *B60W 30/16* (2013.01); *B60W 50/0205* (2013.01);
(Continued)

(58) Field of Classification Search
CPC .............. G05D 1/0038; G05D 1/0061; G05D 1/0088; G05D 1/0282; G05D 2201/0213;
(Continued)

(56) References Cited

U.S. PATENT DOCUMENTS 4,007,450 A  2/1977  Haibt
8,831,780 B2  9/2014  Zelivinski et al.
(Continued)

FOREIGN PATENT DOCUMENTS

CN  102354212 A  2/2012
CN  104486395 A  4/2015
(Continued)

OTHER PUBLICATIONS

Japanese office action dated Jan. 18, 2023, from corresponding Japanese patent application No. 2021-500372.
(Continued)

*Primary Examiner* — Donald J Wallace
(74) *Attorney, Agent, or Firm* — AlphaPatent Associates Ltd.; Daniel J. Swirsky

(57) ABSTRACT

Device, system, and method of autonomous driving and tele-operated vehicles. A vehicular Artificial Intelligence (AI) unit, is configured: to receive inputs from a plurality of vehicular sensors of a vehicle; to locally process within the vehicle at least a first portion of the inputs; to wirelessly transmit via a vehicular wireless transmitter at least a second portion of the inputs to a remote tele-driving processor located externally to the vehicle; to wirelessly receive via a vehicular wireless receiver from the remote tele-driving processor, a remotely-computed processing result that is received from a remote Artificial Intelligence (AI) unit; and to implement a vehicular operating command based on the
(Continued)

remotely-computed processing result, via an autonomous driving unit of the vehicle or via a tele-driving unit of the vehicle.

46 Claims, 4 Drawing Sheets

(51) Int. Cl.
| | |
|---|---|
| *B60W 50/02* | (2012.01) |
| *B60W 50/04* | (2006.01) |
| *B60W 60/00* | (2020.01) |
| *G01C 21/34* | (2006.01) |
| *H04W 84/18* | (2009.01) |

(52) U.S. Cl.
CPC ........ *B60W 50/04* (2013.01); *B60W 60/0015* (2020.02); *B60W 60/0059* (2020.02); *G01C 21/3461* (2013.01); *G05D 1/0061* (2013.01); *G05D 1/0088* (2013.01); *G05D 1/0282* (2013.01); *B60W 2420/403* (2013.01); *B60W 2420/408* (2024.01); *B60W 2420/54* (2013.01); *B60W 2556/50* (2020.02); *H04W 84/18* (2013.01)

(58) Field of Classification Search
CPC ............... G05D 1/0022; G05D 1/0297; G05D 1/0011; B60W 30/16; B60W 50/0205; B60W 50/04; B60W 60/0015; B60W 60/0059; B60W 2420/42; B60W 2420/52; B60W 2420/54; B60W 2556/50; B60W 2050/0064; G01C 21/3461; H04W 84/18; H04W 4/44; H04W 72/04; G08C 17/02; H04Q 9/00; H04Q 2209/40
See application file for complete search history.

(56) References Cited

U.S. PATENT DOCUMENTS

| | | | |
|---|---|---|---|
| 9,031,499 B2 | 5/2015 | Pandey | |
| 9,369,921 B2 | 6/2016 | Altman | |
| 9,507,346 B1 | 11/2016 | Levinson | |
| 9,776,638 B1 | 10/2017 | Green | |
| 2007/0112700 A1 | 5/2007 | Den Haan | |
| 2014/0067257 A1 | 3/2014 | Dave et al. | |
| 2014/0242904 A1 | 8/2014 | Pandey et al. | |
| 2015/0356648 A1 | 12/2015 | Baryakar | |
| 2016/0018821 A1 | 1/2016 | Akita | |
| 2016/0139594 A1 | 5/2016 | Okumura | |
| 2016/0255531 A1 | 9/2016 | Stein | |
| 2016/0358475 A1 | 12/2016 | Prokhorov | |
| 2016/0379486 A1 | 12/2016 | Taylor | |
| 2017/0192423 A1 | 7/2017 | Rust | |
| 2017/0221362 A1 | 8/2017 | Gunaratne | |
| 2018/0004211 A1 | 1/2018 | Grimm et al. | |
| 2018/0011485 A1* | 1/2018 | Ferren ............... | B60W 50/0205 |

FOREIGN PATENT DOCUMENTS

| | | | |
|---|---|---|---|
| CN | 205670260 U | 11/2016 | |
| CN | 107305741 A | 10/2017 | |
| CN | 107656538 A | 2/2018 | |
| DE | 102010004292 A1 | 7/2011 | |
| JP | 2012-048655 A | 3/2012 | |
| JP | 2016-210355 A | 12/2016 | |
| JP | 2017-133976 A | 8/2017 | |
| JP | 7308920 B2 | 7/2023 | |
| KR | 2012-0069510 A | 6/2012 | |
| WO | 2014/148980 A1 | 9/2014 | |
| WO | WO-2018102475 A1 * | 6/2018 | ......... G01C 21/3407 |

OTHER PUBLICATIONS

Japanese notice of allowance dated Jun. 5, 2023, from corresponding Japanese patent application No. 2021-500372.
Israeli notice before acceptance dated Sep. 4, 2023, with allowed claims, from corresponding Israeli patent application No. 277233.
European office action dated Nov. 28, 2022, from corresponding European application No. 19 770 946.2.
Chinese office action dated Aug. 31, 2023, from corresponding Chinese patent application No. 201980030282.0.
International Search Report in PCT/IL2019/050295, dated Jul. 4, 2019.
Written Opinion of the International Searching Authority in PCT/IL2019/050295, dated Jul. 4, 2019.
Letter from the European Patent Office (EPO) in patent application EP 19770946, dated Oct. 4, 2021.
Letter from the European Patent Office (EPO) in patent application EP 19770946, dated Jan. 27, 2022.
Kan Zheng et al., "Reliable and Efficient Autonomous Driving: The Need for Heterogeneous Vehicular Networks", Toward Autonomous Driving: Advances in V2X Connectivity, IEEE Communications Magazine, Dec. 2015.
Lin Gu et al., "Vehicular cloud computing: a survey", IEEE GlobeCom Workshops, pp. 403-407, Dec. 2013.
Machine Translation of DE 102010004292 A1, obtained from "Google Patents" on Feb. 13, 2022 from: https://patents.google.com/patent/DE102010004292A1/en.
Japanese Office Action dated Jul. 1, 2022 in Japanese patent application No. 2021-500372 with English Translation.
Letter dated Nov. 2, 2023 from the European Patent Office in European patent application EP 19770946.2, "Intention to Grant a European Patent"
Letter dated Jan. 18, 2024 from the European Patent Office in European patent application EP 19770946.2, "Decision to Grant a European Patent"
Office Action dated May 10, 2024 in Chinese patent application No. CN 201980030282.0.
Machine Translation generated on May 15, 2024 by "Google Translate" from the main text of the Second Office Action (dated May 10, 2024) in Chinese patent application No. CN 201980030282.0.
Notice of Allowance dated Jul. 8, 2024 in Chinese patent application No. CN 201980030282.0.
English translation of the Notice of Allowance dated Jul. 8, 2024 in Chinese patent application No. CN 201980030282.0.
Office Action dated May 9, 2024 in Korean patent application No. 10-2020-7029686.
English translation of the Office Action dated May 9, 2024 in Korean patent application No. 10-2020-7029686.

* cited by examiner

DEVICE, SYSTEM, AND METHOD OF AUTONOMOUS DRIVING AND TELE-OPERATED VEHICLES

CROSS-REFERENCE TO RELATED APPLICATIONS

This patent application is a National Stage of PCT international application number PCT/IL2019/050295, having an international filing date of Mar. 17, 2019, published as international publication number WO 2019/180700 A1, which is hereby incorporated by reference in its entirety; which claims priority and benefit from U.S. patent application No. 62/644,510, filed on Mar. 18, 2018, which is hereby incorporated by reference in its entirety.

FIELD

The invention relates to the field of teleoperation of vehicles or remote driving, as well as to autonomous vehicles and self-driving vehicles (land, air, sea), artificial intelligence, communication with vehicles, wireless communication, and cellular communication.

SUMMARY

Some embodiments of the present invention include devices, systems, and methods of autonomous driving and tele-operated vehicles. For example, a vehicular Artificial Intelligence (AI) unit is configured: to receive inputs from a plurality of vehicular sensors of a vehicle; to locally process within the vehicle at least a first portion of the inputs; to wirelessly transmit via a vehicular wireless transmitter at least a second portion of the inputs to a remote tele-driving processor located externally to the vehicle; to wirelessly receive via a vehicular wireless receiver from the remote tele-driving processor, a remotely-computed processing result that is received from a remote Artificial Intelligence (AI) unit; and to implement a vehicular operating command based on the remotely-computed processing result, via an autonomous driving unit of the vehicle or via a tele-driving unit of the vehicle.

The present invention may provide other and/or additional benefits or advantages.

DETAILED DESCRIPTION OF SOME DEMONSTRATIVE EMBODIMENTS OF THE PRESENT INVENTION

Figure 1:
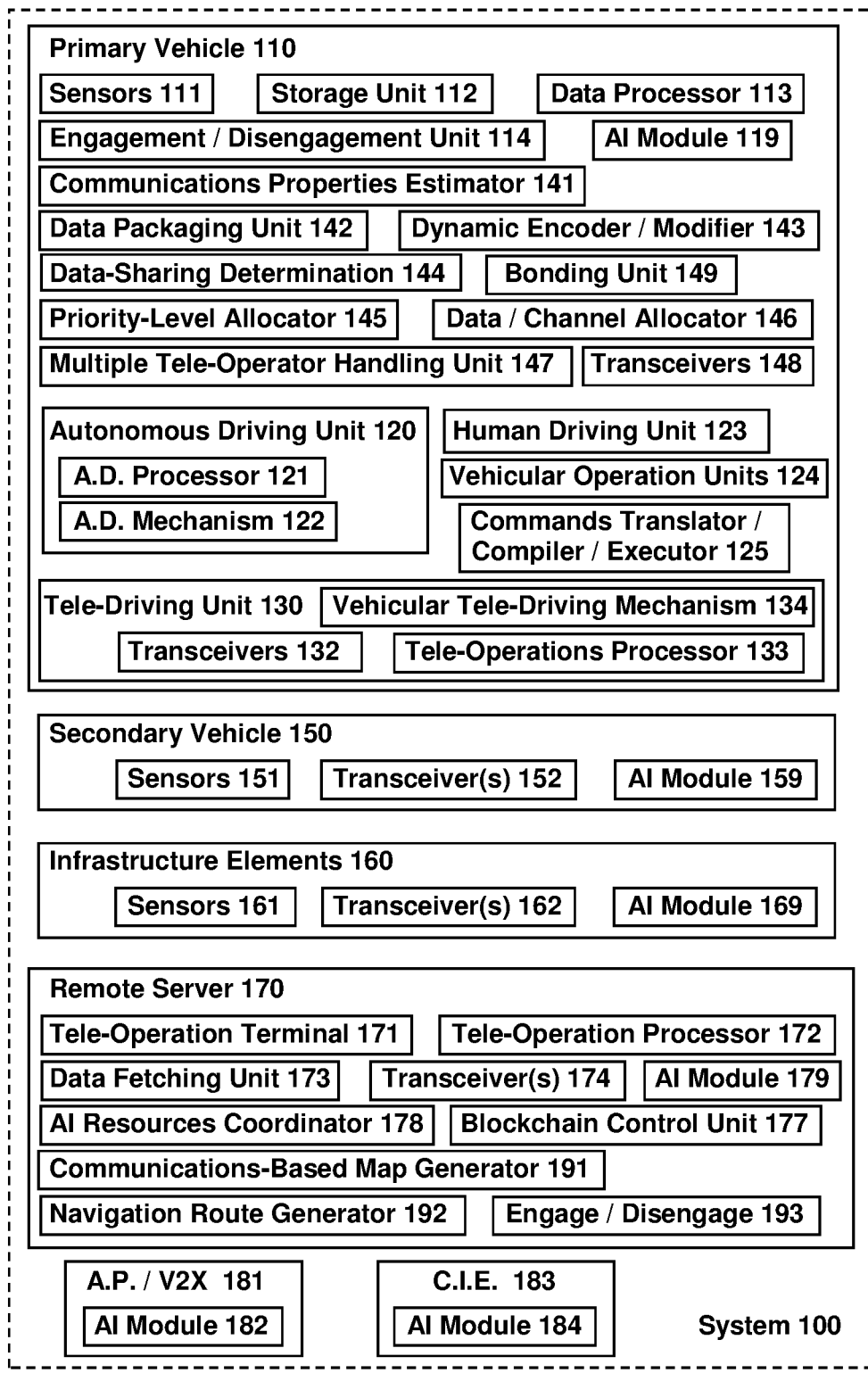
FIG. 1 is a schematic illustration of a system, in accordance with some demonstrative embodiments of the present invention.

Reference is made to FIG. 1, which is a schematic illustration of a system 100, in accordance with some demonstrative embodiments of the present invention. System 100 may include a primary vehicle 110 (which may be a drone or other machine); one or more other vehicles or surrounding vehicles or nearby vehicles, which may be referred to as "secondary" vehicles, such as a secondary vehicle 150; one or more infrastructure elements 160 (e.g., a traffic light; a traffic sign; a bus stop; a road sign; a sidewall device; a road-embedded device; a mobile network infrastructure device; an Access Point or Hot Spot or Hot Point device; an antenna, a Radio Frequency (RF) transceiver or modem or relay unit or amplifier or repeater; a cellular antenna or tower or eNodeB or base station) and particularly, an infrastructure element that is configured or able to communicate wirelessly with vehicles and/or with other local entities and/or remote entities); and a remote server or remote node or edge computing/edge cloud node 170.

Primary vehicle 110 may comprise one or more sensors 111 which may be of one or more types and models, for example, imagers, cameras, microphones, image acquisition units, video acquisition units, distance detectors, LIDARs, proximity sensors, RADARs or the like; which are able to continually and/or intermittently sense the surrounding of the vehicle. A vehicular storage unit 112 (which may optionally be distributed) and stores data, raw data and/or partially-processed data and/or processed data, that is captured or acquired by the vehicular sensors 111, and/or data that was captured by such sensor(s) and was then locally processed (partially or fully) by a vehicular data processor 113 (which may optionally be distributed).

It is noted that the various vehicular units or modules that are described above or herein, may be implemented in a variety of ways; for example, as a roof-top sub-system having a roof-top housing or capsule or encapsulation, such that units or modules (or at least some of them) are located physically on top of the roof of the vehicle; and/or as an in-vehicle sub-system such that units or modules (or at least some of them) are located physically within the vehicle, within the passenger cabin, or near the motor or engine, or in the trunk of the vehicle; and/or under the vehicle; and/or as an accessory which may be plugged-in to the vehicle; and/or as a distributed sub-system whose units or modules are distributed across multiple areas of the same vehicle (e.g., on the roof; under the hood; under the vehicle; near the motor or engine; in the trunk; in the passengers cabin; embedded in the vehicular dashboard; or the like).

Primary vehicle 110 may further comprise a human driving unit 123, which may enable a human driver or a human in-vehicle user to drive and/or operate and/or control the vehicle 110; for example, via a Human-Machine Interface (HMI) or via a driving interface or a vehicle control interface (e.g., steering wheel, acceleration pedal, brake pedal, gear shifting stick or buttons or interface, a vehicular dashboard or screen indicating the current speed and/or direction of the vehicle and/or the rounds-per-minute of the motor, signaling UI elements, or the like; or an HMI that utilizes other components, such as, joystick, mouse, trackball, touch-screen, touch-pad, screen, pedals, steering wheel, wearable gear or head-gear or goggles or glasses or helmet, tactile elements, haptic elements, or the like); which in turn may directly or indirectly control or trigger or command or actuate or engage with the various Vehicular Operation Units 124, such as, motor or engine, steering sub-system, acceleration sub-system, brakes or braking sub-system, gears sub-system, electric sub-system, and/or other particular units of the vehicle, such as, tubes or pipes that transfer gas or fuel, pistons, valves, ignition elements, vehicular actuation and control components, switches, controllers, a vehicular driving processor, or the like.

Primary vehicle 110 may further comprise, optionally, an autonomous driving unit 120; which may analyze the sensed data, and may generate driving commands and cause their execution based on analysis of the sensed data. For example, the autonomous driving unit 120 may determine that another vehicle is located in front of the primary vehicle 110, and that the primary vehicle 110 is expected to hit the other vehicle in 6 seconds unless the primary vehicle slows down; and the autonomous driving unit 120 may thus command accordingly the other units of the primary vehicle 110, such as the Vehicular Operation Units 124 and/or the engine and/or the motor and/or the brakes or any actuator or processor, e.g., to reduce or to stop the amount of gas that is supplied to the engine (e.g., similar to a human driver releasing the gas pedal partially or entirely), and/or to engage the brakes and/or to increase a force of a braking process (e.g., similar to a human driver starting or continuing to push the brake pedal) or to reduce or cut the electrical power supply for an electrical or hybrid engine vehicle. These operations may be determined or commanded by a vehicular autonomous driving processor 121; and may be executed or initiated or performed or triggered by a vehicular autonomous driving mechanism 122 (e.g., implemented using mechanical components, levers, pistons, pumps, tubes, mechanical elements able to open or close an opening of a gas tube, mechanical elements able to push or release a lever or a pedal, mechanical elements able to rotate a steering mechanism similar to the result of a human driver rotating a steering wheel, electromechanical units or electronics such as processors, power suppliers, power switches, power converters, power distributors, or the like).

Additionally or alternatively, the primary vehicle may comprise a tele-driving unit 130 or a remote-driving unit, or a tele-operation or remote-operation unit, which may enable a remote operator (e.g., human, or computerized, or AI-based) to remotely drive or to remotely operate the primary vehicle 110 via wireless communication of driving commands and/or vehicular operation commands from a remote transmitter to the primary vehicle 110 or otherwise remotely intervene in its operation. For example, one or more vehicular transceiver(s) 132 (e.g., cellular transceiver, Wi-Fi transceiver) which may be located in the or at or near the tele-driving unit 130, and/or other vehicular transceivers 148 or in-vehicle transceivers (e.g., which may be part of the vehicle 110 but need not necessarily be part of the self-driving unit 130), may transmit or upload data, and particular data sensed by the vehicular sensors 111 and/or data that was processed (partially or fully) by the vehicular data processor 113, to a remote recipient such as remote server 170. It is noted that each one of transceivers 148 and/or transceivers 132, may comprise or may be coupled to or may include or may be associated with, one or more antennas; and similarly, any other transceiver that is part of system 100 may be coupled to or may include or may be associated with one or more antennas; and such antennas may be internal and/or external and/or co-located, and/or may optionally be shared by multiple or co-located transceivers in the same device, and such antennas are not shown in FIG. 1 in order to avoid over-crowding of the drawing.

A human tele-operator may engage via a tele-operation terminal 171 or other computing device with the remote server 170, and may generate vehicular driving or vehicular operation commands, remotely and externally relative to the primate vehicle 110. The tele-operation terminal 171 may comprise, or may be coupled to or associated with, a Human-Machine Interface (HMI), which may include, for example, touch screen, screen, joystick, touch-pad, computer mouse, steering wheel, pedals, gear shift device, microphone, speakers, Augmented Reality (AR) or Virtual Reality (VR) equipment (e.g., wearable device, helmet, headgear, glasses, googles, gloves, or the like), haptic elements, tactile elements, gloves, other wearable elements, lights, alarms, or the like.

Additionally or alternatively, a remote tele-operation processor 172, which may be part of remote server 170 or may be in communication with remote server 170, may process the data received from the primary vehicle 110, and may generate vehicular driving or vehicular operation commands, or driving guidelines or instructions, or location related commands, or waypoints to the vehicular AI system, or approval/confirmation (or conversely, rejection or cancellation) to an AI-planned route with or without changes to it, remotely and externally relative to the primate vehicle 110. The remote tele-operator, whether human or computerized, may take into account other data that was not necessarily sensed or received from the primary vehicle 110; for example, data sensed and/or received from other vehicles, data sensed or received from infrastructure elements (e.g., taking into account that a traffic light is about to change from green to red in five seconds from now at 40 meters ahead of the primary vehicle), weather data, seismic data, vehicular traffic data, or the like; and such data may be obtained or received via a data fetching unit 173, which may be part of remote server or may be associated with it or controlled by it. Optionally, the Tele-Operations Processor 172 of the remote server 170, may comprise, or may be associated with, an Engagement/Disengagement Unit 193, which may be responsible for reaching the decision whether to engage or disengage the remote operation or the tele-operation, or whether to allow the vehicle 110 to proceed without forced remotely-generated tele-operations or commands, or whether to over-ride the in-vehicle autonomous driving unit 120 of the vehicle 110, or whether to otherwise remotely cause, or trigger, or activate, or deactivate, or start, or stop, an Engagement process or a Disengagement process, relative to the primary vehicle 110.

The remotely-generated driving commands are transmitted from the remote server 170 (or from a transmission unit associated with it or controlled by it), directly or indirectly, to the vehicular transceiver(s) 132. A vehicular tele-driving processor 133 analyzes the incoming or received signals or messages of tele-operation commands, and optionally converts or translates them into locally-actionable commands that the vehicular system and the various Vehicular Operation Units 124 can then execute, if they are not delivered in this direct format. Optionally, such translation or conversion may be performed by a dedicated component or a secondary processor, such as a Commands Translator/Compiler/Executor 125, which may be implemented as part of the tele-driving unit 130, or may be external to or coupled to or associated with the tele-driving unit 130, or which may be an in-vehicle component that translates or converts or interprets commands or signals between the tele-driving unit 130 and the Vehicular Operation Units 124 that need to actually be actuated or activated or de-activated or configure or modified in order to realize the actual command. The Commands Translator/Compiler/Executor 125 may also convert or translate a single remote command or a single tele-driving command, into a set of particular in-vehicle commands that control or modify the operation of the various Vehicular Operation Units 124. The Commands Translator/Compiler/Executor 125 may also convert or translate a set or batch or series of remote commands or tele-driving commands, into a single particular in-vehicle command (or, into a different, converted, set of multiple in-vehicle commands) that control or modify the operation of the various Vehicular Operation Units 124. The Commands Translator/Compiler/Executor 125 may optionally comprise, or may utilize, or may be associated with, or may be implemented with or by, a Controller Area Network (CAN) or a CAN bus, optionally via the CANBUS protocol or other suitable protocol, that allows various microcontrollers and Vehicular Operation Units 124 to communicate with each other and/or to exchange commands and/or data and/or signals with each other.

If the received tele-operation commands are "meta-commands" (or, commands that are generic in their nature or that are provided in a format that any vehicle can interpret, such as, "come to a complete stop within two seconds" or "accelerate right now to 60 mph"), or commands that may generate or initiate a sequence of operations in the vehicle, such as AI-based driving instructions, then the vehicular tele-driving processor 133 may distribute them to the relevant units or processor(s) (if not co-implemented) and such other units or processors then generate the actual driving and actuating commands to the vehicular mechanical systems or units. The vehicular tele-driving processor 133 may thus command accordingly the other units of the primary vehicle 110, such as the engine and/or the brakes, as described above. These operations may be executed or initiated or performed or triggered by a vehicular tele-driving mechanism 134 (e.g., implemented using mechanical components, levers, pistons, pumps, tubes, mechanical elements able to open or close an opening of a gas tube, mechanical elements able to push or release a lever or a pedal, mechanical elements able to rotate a steering mechanism similar to the result of a human driver rotating a steering wheel, electric power handling elements or electronics or processors, or the like).

In some embodiments, the vehicular autonomous driving processor 121 and the vehicular tele-driving processor 133 may be implemented using a single processor, or as a unified component, or as a set of components that share at least some of the logic. In some embodiments, the vehicular autonomous driving mechanism 122 and the vehicular tele-driving mechanism 134 may be implemented using a single mechanical system, or as a unified mechanical system, or as a set of components that share at least some unified elements or functions.

Primary vehicle 110 may further comprise an Engagement/Disengagement Unit 114, which may be responsible of engaging and/or disengaging one or more of the above-mentioned functionalities, and particularly, to engage or disengage the autonomous driving of the vehicle by the autonomous driving unit 120, and/or to engage or disengage the tele-driving or the tele-operation of the vehicle via the tele-driving unit 130, and/or to force the vehicle into being controlled manually and exclusively by a human driver or a human passenger located within the vehicle, and/or to force the vehicle to be controlled exclusively via the vehicular autonomous driving unit 120, and/or to force the vehicle to be controlled exclusively via the tele-driving unit 130 based on incoming commands, and/or to force the vehicle to be controlled by two or more means of control with a pre-defined order of priority (e.g., the vehicle would perform the tele-driving command unless it is in conflict with a local autonomous driving command which would thus prevail and would be executed, and/or to cut the power to an electric-power vehicle and/or to otherwise initiate an immediate stopping or stalling procedure in any vehicle). The Engagement/Disengagement Unit 114 may operate based on local analysis of the sensed data and/or of other data that is known within the primary vehicle (including, in some embodiments, based on data that the primary vehicle 110 received from external sources, such as weather conditions, seismic condition, volcanic conditions, traffic conditions, information from other vehicles or roadside infrastructure, or the like). Additionally or alternatively, the Engagement/Disengagement Unit 114 may operate based on a remote tele-operation command or input, or based on a locally-generated command or input that was generated by the autonomous driving unit 120. For example, the remote server 170 (which may be, or may include, a node or edge node) may remotely command the Engagement/Disengagement Unit 114 to perform one or more of the above-mentioned engagement/disengagement operations, based on input from a remote tele-operator (human or computerized); or, the autonomous driving unit 120 may locally command the Engagement/Disengagement Unit 114 to perform one or more of the above-mentioned engagement/disengagement operations.

In accordance with the present invention, each one of one or more infrastructure elements 160 may comprise one or more sensors 161 (e.g., from cameras, microphones, sensors, Light Detection and Ranging (LIDAR) sensors, RADARSs or RADAR sensors, or the like), one or more transceiver(s) 162 (e.g., cellular transceiver, Wi-Fi transceiver), and an AI module 169 (e.g., implemented using a processor and a memory unit).

Similarly, secondary vehicle 150 may comprise one or more sensors 151 (e.g., from cameras, microphones, sensors, Light Detection and Ranging (LIDAR) sensors, RADARs or the like), one or more transceiver(s) 152 (e.g., cellular transceiver, Wi-Fi transceiver), and an AI module 159 (e.g., implemented using a processor and a memory unit).

Additionally, primary vehicle 110 may comprise an AI module 119; and the remote server 170 may comprise or may control, or may be associated with, a remote AI module 179.

In accordance with the present invention, data is sensed by the multiple sensors, such as vehicular sensors 111 of primary vehicle 110, and/or vehicular sensors 151 of secondary vehicle 150, and/or sensors 161 of infrastructure elements 161. The sensed data is exchanged, transmitted and/or received among entities in the system via transceivers (132, 152, 162, 174); including sensed data, raw data, partially-processed data, fully processed data, data from external sources, and/or commands or signals that are generated based on analysis of data. In accordance with the present invention, each one of the sensors (111, 151, 161) may provide sensed data that may be utilized by the same entity in which the sensor is located, and/or by other entities in the system; and similarly, each AI module (119, 159, 169, 179) may contribute processing power and AI resources in order to reach the most suitable decision with regard to engagement/disengagement and/or with regard to tele-operation of the primary vehicle 110 and/or with regard to autonomous driving of the primary vehicle.

In some embodiments, remote server 170 may be implemented as a "cloud computing" server or element; or may be located in relative proximity to the primary vehicle 110 in order to shorten the communication time that is required between the primary vehicle 110 and the remote server 170 (e.g., optionally implemented as, or by using, an edge node or a cellular edge node or a wireless edge node, or a cloud-based platform). For example, an Access Point (AP)/V2X Element 181 (e.g., comprising one or more of: Wi-Fi Access Point or transceiver; Satellite-based communication node or element or transceiver or terminal; DSRC node or element; V2X node or element; or the like) may comprise an AI module 182 which may similarly assist in AI analysis for the purpose of operating the primary vehicle 110. Similarly, a Cellular Infrastructure Element (CNE) 183 (e.g., eNodeB, or gNodeB, or cellular edge unit or tower or site, cellular base station, fixed or non-moving cellular transceiver or station or amplifier or repeater or relay node, or the like) may comprise an AI module 184 which may similarly assist in AI analysis for the purpose of operating the primary vehicle 110.

The Applicants have realized that autonomous vehicles and self-driving vehicles are expected to become a reality and may even take over vehicles being driven by human drivers that physically sit at the wheel of the car or vehicle (or motorcycle, or train, or truck or bus or drone or helicopter or aircraft or ship or wheelchair or any other form of moving machine or other means of transportation by land, by air, or by sea).

The Applicants have realized that Artificial Intelligence (AI or A.I.) systems may be developed in order to allow a vehicle to be driven autonomously by a computer residing in the vehicle and running this such AI system or module. The Applicants have also realized that in some cases and countries or geographical locations it may be desired or even mandated that a remote human driver shall be able to take over or otherwise assist or instruct the local (vehicular, or in-vehicle) AI driving module or vehicular computer, for example, in emergency situations, and/or in cases that are not learnt or not trained or not recognized or not assured by the local (in-vehicle) AI system or vehicular computer.

The Applicants have also realized that in some scenarios, there may also be a human driver sitting in the vehicle ready to take local control of the vehicle as needed or if needed. This scenario, in which the AI self-driving module is stopping to function as the dynamic driver, may be referred to as "disengagement" of the self-driving module or system. In some situations, such disengagement implies a partial or full failure of the local AI module(s) to perform the actual dynamic self-driving driving operations, momentary or during a prolonged time period or even permanently.

The Applicants have realized that such disengagement process may not be sufficiently smooth or quick enough or just less so than possible, or may be abrupt or may be problematic, for example, due to the local human driver being negligent, or due to the human nature of falling into complacency or being bored by the passive monitoring task and then suddenly being surprised into action at the spare of a moment out of a very bored and half-aware state, or since the human driver may be non-attentive or may be distracted or may be occupied with other tasks (e.g., utilizing his smartphone), or due to other reasons.

The Applicants have also realized that in such situations, intervention by a remote driver may be even more difficult as such remote driver (human or automated) or such human tele-operator or such remote tele-operator may not be able to actually see the surrounding continuously and at the same quality as the local onboard driver or sensors, as there may be a latency or delay in relaying the sensory information or the sensed information (e.g., from cameras, microphones, sensors, Light Detection and Ranging (LIDAR) sensors, or the like) from the vehicle to the remote intervening driver or to a tele-operating person or module.

The Applicants have realized that there may be actual or potential instability or non-reliability of the wireless or cellular network link or connection from and/or to the vehicle, and as a result, actual or potential instability or non-reliability of the received sensory information at the tele-operator, thereby making it difficult or sometimes impossible for the remote teleoperator to monitor and/or be ready to intervene or handle remote driving (e.g., particularly if the tele-operator person or module may need to monitor and/or control more than a single vehicle).

The Applicants have also realized that redundancy of systems, both of hardware and of software and especially of AI components or modules and/or of communications, may be desired or may even be mandated in order to increase the safety and service level of autonomous driving and/or self-driving systems and/or remote driving systems, especially for reaching and supporting SAE Level 3, SAE Levels 4 and/or 5 (as defined by the Society of Automotive Engineers).

The Applicants have further realized that AI systems may be developed with an intention to serve only the vehicle in which they run. The Applicants have realized that AI systems may be developed to also benefit other vehicles, other service operators, communication networks operators, pedestrians, city operations, urban planners, or other users or stakeholders of the roads or of the geographical region or of the data being sensed and/or processed, in real time and/or offline and/or in retrospect.

The Applicants have realized that, for example, a vehicular AI module within the vehicle may be communicating with an external and/or remote AI layer or AI module(s) in a remote teleoperator's facility or a proxy or agent of such, may transmit to it only a pre-configured or pre-defined part or portion (e.g., per-condition type or portion) or an adaptive dynamic part or a learnt part of the sensory information as this local vehicle that the vehicular AI module decides to do at every point in time, such as in view of its determined or estimated level of safety or assurance or prediction for the upcoming travel portion or the upcoming road segment or the availability or quality or cost of the wireless and/or cellular communication connection(s) connecting the vehicle with remote entities, or by taking into account other dynamic or static parameters and considerations and conditions.

For example, a vehicular Communications Properties Estimator 141 may operate to continuously or periodically estimate or re-calculate the current or momentary properties of communications channels that are available to the primary vehicle 110 (e.g., bandwidth, throughput, good-put, error rate, packet error rate, rate of dropped or missing packets, rate of erroneous packets, latency, delay, lag time, or other data and performance related parameters or the like); and/or may take into account recent or previous or past values of such properties (e.g., in the past 10 or 30 or 60 or 120 seconds, or in the past 3 or 5 or 10 minutes), and/or may take into account predicted values of such properties (e.g., predicted to be in the upcoming 30 or 60 or 120 seconds, or in the upcoming 2 or 5 minutes; such as, by taking into account the route that the vehicle is expected to travel and by obtaining an indication that in the next two minutes the vehicle is expected to drive through a valley having low cellular reception).

A vehicular Data Packaging Unit 142 may take into account the communication properties that are estimated by the Communications Properties Estimator 141; and may prepare a data-package to be sent or transmitted or uploaded wirelessly from the primary vehicle 110 to the remote server 170 or to other wireless recipients (e.g., an infrastructure element 160, a secondary vehicle 150, a nearby eNodeB or gNodeB, a cellular RAN element or a cellular Core element or an IP ISP (Internet Service Provider) or a nearby AP/V2X communication node 181, or the like). The Data Packaging Unit 142 may determine which portion(s) or part(s) or segment(s) of the vehicular sensed data (e.g., in raw format or in partially-processed or processed format) to include in an outgoing transmission, or to omit or discard.

Furthermore, a vehicular Dynamic Encoder/Modifier 143 may optionally operate to encode or transcode or re-encode or convert the data-segments or data-portions that are intended for transmission, from a first format or data-structure to a second format or data-structure, and particularly to a reduced-size format or a compressed format; for example, by reducing a resolution of an image or a video-segment, and/or by reducing a color-depth of an image or a video-segment, and/or by modifying a compression ratio of an image or a video, or by changing an audio segment from stereo to mono, or by changing bitrate or sampling rate or sampling frequency of audio stream(s) and/or video stream(s), and/or by discarding or omitting or diluting or skipping frames or packets or video-segments or audio-segments (e.g., discarding every Nth frame, or every second frame, or every third frame; discarding every Nth millisecond of audio-data or video-data or image-data), and/or by performing other modifications.

The packaged data-segments may then be transmitted wirelessly by the vehicular transceiver(s) 132 of the primary vehicle 110 to one or more other entities, as mentioned above; and the AI module(s) of such other entities may operate to assist in the processing of such data in order to provide to the primary vehicle 110 input and/or commands that would be utilized by the autonomous driving unit 120 of the primary vehicle and/or by the tele-driving unit 130 of the primary vehicle and/or by the engagement/disengagement unit 114 and/or by other units of the primary vehicle 110.

In some embodiments, the present invention includes devices, systems, and methods of remote driving and/or tele-operation of a vehicle or of an autonomous vehicle, particularly using Artificial Intelligence and broadband wireless connectivity such as using multiple-link vehicular communication, and/or optionally utilizing distributed AI resources which may comprise at least one AI module that is external to the vehicle being driven and/or that is remote to the vehicular being driven, and/or with human intervention from a remote location (external from the vehicle and remote relative to the vehicle) with or without the AI modules. The present invention may provide other and/or additional benefits or advantages.

The present invention includes devices, system and methods for adding redundancy, reliability and availability to remote teleoperation in communications, AI functions and remote teleoperators—both human and AI-based, and teleoperators centers, while increasing the quality of data being shared from the vehicle and reducing the latency for remote intervention, and further when adapting said mechanisms to unsupervised ongoing AI training that learns the and responds to various road and traffic scenarios, various communication conditions and performances, various vehicular conditions, various remote teleoperators responses, network deployments and performances, or others; and may further enable to share and synchronize multiple remote teleoperation of same or different vehicles. The present invention may further enable to match generating, formatting, diluting, compressing or otherwise processing as well as sending data from the vehicles and splitting them onto the available communication connections and combinations of them, taking into account their cost and momentary performance characteristics. Furthermore, some embodiments may optimally or efficiently distribute AI processing tasks and elements through or via overlaying telecom networks, including 5G with numerous (e.g., hundreds or thousands) micro cells deployments, so that relevant or optimal AI assistance can be executed at the network edge or close to it.

The present invention includes an apparatus, method and system for using multi layered or multi-components of Artificial Intelligence which may be distributed onto several locations, one of which is at least one vehicle. These AI layers or components or modules communicate between or among themselves using one or more adequate or suitable communication links, at least some of which are wireless and/or cellular links of any suitable type connecting the vehicular AI component to the infrastructure, to a central remote AI component or layer, to other AI components or layers running in the edge of the communication networks such as Access Points or eNodeBs (eNB) or others in the cellular infrastructure RAN or Core or higher IP communication layers, to the AI components or layers running within a core network (such as XUF or XPF or PCF or AMF or XCF or SMF or RAN or Core Network component or a dedicated function or any other component in 3GPP cellular network) or access of the communication networks between the vehicular component and any other central or local component, to the AI components running in other vehicles or transportation means or pedestrians, or to any other component or layer of the system.

The AI component or the AI module(s) (119, 159, 169, 179) may be based on any suitable mechanism or algorithm or paradigm or method, including, for example: deep learning, machine learning, a Neural Network (NN), deep learning, supervised learning, unsupervised learning, reinforced learning, heuristic based or assisted decisions (sometimes not referred to as AI at all) or a combination of any of these or other decision making methods, including human-involved decisions.

Optionally, an AI Resources Coordinator Unit 178 may be included in system 100, for example, as part of remote server 170, or as a stand-alone unit, or as a unit controlled by remote server 170, or as a unit external to primary vehicle 110, or as a unit that is remote from primary vehicle 110, or as a fixed non-moving unit, or alternately as a vehicular or in-vehicle unit within primary vehicle 110. The AI Resources Coordinator Unit 178 may control or modify the distribution of AI tasks or resources among the available or the participating AI resources or AI modules. In a first example, the AI Resources Coordinator Unit 178 may receive indications that the primary vehicle 110 is located in close proximity to (e.g., four meters away from) a smart wireless traffic sign which has an AI module; and the AI Resources Coordinator Unit 178 may indicate to the primary vehicle 110 to transmit over Wi-Fi a live High Definition video stream to the nearby smart traffic sign, so that the AI module of that smart traffic sign would process the HD video stream in real-time or in near-real-time using the fast processor and abundant memory of that smart traffic sign. In a second example, the AI Resources Coordinator Unit 178 may determine that a physically-nearby eNodeB or another cellular network element or edge computing processor is able to efficiently process data of LIDAR and proximity sensors of the primary vehicle, and may allocate to that eNodeB the task of that particular processing. The AI Resources Coordinator Unit 178 may further control which entity sends raw data and/or processed results to which other entity or entities in system 100, and may further control what the recipient entity should do with the data or signals that it receives. In some embodiments, the AI Resource Coordinator Unit 178 may be a learning machine, which decides and controls according to the learnt information about the load, predicted load, estimated load, current AI task requested, locality and availability of data relevant to the AI task requested, cost of connectivity and data exchanges, power consumption or other parameters, and/or any other correlation that it detects over time, which is used for determining or predicting the best or most efficient recipient entity for that particular data or signals or AI task.

In some embodiments, the vehicular AI module 119 or other component examines or analyzes the sensory or other data and determines the objects around it, near or remote, static or in motion, at any X, Y, Z axis and/or time, in any representation of them—sparse, core-set, categorized, classified, aggregated, full, partial, compressed, raw or other. The AI module may assign a weight to each such parameter, indicating the level of assurance or certainty that it has about this object or representation or parameter or set or subset of such parameters. This certainty indicator or weight or score may be a single indicator or it may be a set of indicators or coefficients for a set of different characteristics or features of the object. For example, one assurance weight indicator may be assigned for the probability that one object is a car, or a truck, or a pedestrian or a lane; a second assurance weight indicator may be assigned for the probability that its X size (e.g., its length dimension) is as calculated, and a third indicator may be assigned for the probability that its Y size (e.g., its width dimension) is as calculated, and so on for every characteristic or feature(s) it may deem important for each such object. Identifying which features are important for each object at each scenario or point in time, including in view of other objects in the scene or absent from it, and including of the vehicular conditions and state and features and dynamic parameters, may be either known in advance, or heuristically learnt or adapted, or may be learnt or adapted via the mechanisms of the invention AI, both at the vehicular AI level or at the remote AI component or layer level, or any combination of them; or may be dependent on one or more conditions.

Once such a set of indicators, or a single summary indicator, of probability or assurance is (or are) calculated, the local in-vehicle AI component such as AI module 119 may check and may determine whether or not this calculated weight is below a pre-defined static threshold value, or a dynamically-determined (dynamically modified) threshold value in view of the scene or in view of the other conditions or components or of the vehicle state. In such case, the vehicular AI module 119 or AI component may decide to share this analysis, or part of it, or the raw data that yielded it, or partially-processed data that yielded it, or any representation of it, or any of the other relevant sensory or processed data, with other one or more AI layer(s) or component(s) or module(s) which may be remote and/or external to the vehicle. Such decision to share may be taken in other processing algorithms or methods as well; for example, in some implementations, it may share all the sensory data, in uncompressed or raw format.

The decisions whether or not to share data with external entities for further processing, as well as which data or data-segments to share and/or in which format(s) and/or via which communication link(s), may be performed by a Data-Sharing Determination Unit 144. For example, such sharing may be needed or advised or chosen for any suitable reason, for example—for consultation with another AI component or layer or module, such that the system may have additional data or additional or stronger computing power or may be powered by more data that was collected or analyzed historically and therefore may have better assurance indicator(s), or for purposes of obtaining a "second opinion" or even a "crowd-based" or "crowd-sources" opinion from one or more than a single AI module that is remote and/or external to the vehicle, or as a procedural step mandated by the vehicular or AI system vendor or by a regulator, or for any other suitable reason. In another type of cases, such sharing, of the same data or of a different set of data, may be selected or performed in order to assist in educating and teaching and training one or more other AI components in the system (e.g., external to the vehicle; or located in a remote server or in a cloud computing service; or located in other vehicles), for example, to allow them to make real time decisions regarding other vehicles or pedestrians or other objects, and/or for offline training or learning to improve overall performance and predictions in the future.

In some embodiments, uplink transmission or upstream transmission or uploading of data from the vehicle 110 towards any entity that is external to the vehicle 110, whether nearby (e.g., a nearby vehicle or a nearby infrastructure element) or remote (e.g., a remote server or a remote AI unit or module or processor), may optionally be performed, at least partially, over or via a virtual bonded communication link or a bonded multi-link, which may be constructed and/or implemented and/or managed and/or configured and/or modified by a bonding unit 149; for example, dynamically; based on, or taking into account, current and/or momentary and/or estimated and/or predicted performance of each transceiver or modem that is available for such transmission or upload or up-stream, in order to dynamically determine and/or modify which transceivers are to perform the upload and which packets are to dynamically allocate to each such transceiver for upload by it; or by selecting a pre-defined or pre-set combination of multiple transceivers and/or a packet allocation scheme. The bonding unit 149 may utilize or may aggregate together multiple wireless communication links, and particularly a bonded (or aggregated, or multi-link) virtual communication link comprised of multiple wireless IP communication links served by multiple vehicular transceivers or multiple in-vehicle or of-vehicle transceivers, or by multiple transceivers that are available for utilization by said vehicle but are not necessarily integrated within said vehicle (e.g., a transceiver of a smartphone or tablet of a human driver or a human non-driver passenger that is within that vehicle); such that each transceiver is able to transmit or upload or stream, in parallel, some of the total packets that need to be uploaded to a certain IP destination address, and such that the recipient unit utilizes an assembly engine or re-assembly engine which re-assembles the packets that are incoming from multiple wireless links into an ordered and correct datastream. Optionally, the bonding unit 149 may define, determine, configure and/or modify, in a dynamic manner, which communication link(s) to utilize and/or which transceivers to utilize for such uplink transmission, thereby generating an ad hoc or a continuous bonded channel or bonded multi-link connection; and/or which packets to allocate for uploading via each available link or transceiver or modem. In some embodiments, the data (e.g., sensed data that is uploaded from the vehicle, and/or processed or partially-processed data that was prepared in the vehicle) may be transmitted via broadcast or unicast or multicast, or via a single one-to-one communication link, or via a single point-to-point communication link, or via a one-to-many communication link or channel, or via a set or group or batch of several one-to-one communication links or of several point-to-point communication links; such as between (or among) the primary vehicle and any subset of the secondary vehicles and/or infrastructure elements and/or the external or remote server or AI unit, in either direction (upstream and/or downstream; uplink and/or downlink; upload and/or download); using half-duplex or using full-duplex communication; optionally with an additional control channel or messaging channel or feedback channel, or without such additional channel. Some embodiments may utilize IP connectivity without necessarily knowing the address of a specific destination, or may allow sending of data from one sender to multiple receivers or a group of receivers which may be listening-in on the same IP network and without necessarily knowing in advance or at the time of the transmission whether and/or how many recipient units are actually listening-in to such transmission or broadcast or multicast or upload or uplink Some of the transmitted information may be relevant to more than one destination device (or recipient, or vehicle, or road user), and therefore some embodiments may utilize broadcasting and/or multicasting as being more efficient and/or having lower delay in delivering the data to more than a threshold number of IP destinations or recipients or information consumers or data processors.

When the AI module 119 or AI component decides or is ordered to share or upload or up-stream information or data with or towards another AI component or any other entity, in some embodiments it may also decide by itself or via a Priority-Level Allocator 145 with regard to the priority level of sharing each piece of information or data, or a set of data-items or a subset of the data, and/or it may decide with regard to the format of the data to be shared or any other feature or property of the data sharing process. For example, it may decide that a camera feed from one of the front-facing cameras of the vehicles shows an object that its classifying or analysis or processing or identification or identifying its movement vector or other property has one or more assurance or probability indicators that are lower than the desired or required assurance probability level threshold in general or under that specific scene and circumstances, and that it is important to gain higher assurance level or higher certainty level regarding this specific indicator or these specific indicators for this current scene or a predicted scene; and therefore it may assign to the sharing of this information a high priority level, such as, for immediate sharing and/or for sharing at a high level of detail and/or at high quality of data. It may also decide that the suitable format for this data to be shared is the raw format as sensed and captured by the camera and/or with its full field of view, so that the remote AI component may have the highest possible level of quality (e.g., maximum pixels or resolution) or sufficiently high enough quality and therefore accuracy for that full or whole or complete view to base its decision on. It may also decide that it has a high priority to send the previous 10 seconds of video from that camera (for the first time, or to send it again) in order to increase the probability of the other (external) AI component or layer to reach a higher level of assurance indicators for that object or objects or scene. It may decide that the set of these two types of data has one combined importance indicator, but also that each of them alone has a different importance indicator as there is a meaning of sending just the current feed, whereas in other cases it may be very low priority to send just the current feed without the previous seconds of the feed, or without additional different sensory raw or processed data.

Then, the AI module 119 or other component in the primary vehicle may examine all the data it decided preferable to transmit at that point in time, with their relevant importance weight. It may prioritize them also in accordance with the availability and quality of the communication channels or connections as it knows them or as it estimates them to be at that particular point in time. For example, a Data/Channel Allocator 146 may operate to determine which data-segment or data-portion or data-stream is allocated to be transmitted by which particular transceiver(s) and/or communication link(s) and/or communication channel(s). For example, if information item A, being for example a high definition digital video stream compressed to a relatively high bit rate at delay X1 from the source due to the video compression process, and information item B, being for example a stream of sparse object representation of that video feed at X2 microseconds delay from the source, and information item C, being a stream of sparse representation of the front LIDAR sensor at latency X3 from the source (e.g., due to the AI process of classifying it and processing it), and information item D, being a sparse fusion of the side-angles LIDAR slice or angular image (e.g., 90 degrees or 110 degrees or 45 degrees) and a side-facing camera feed at a latency X4 from the source due to the processing time, and these four types of data were calculated to have the priority in which they were listed in the above example for that specific scene or in general to be transmitted to another remote AI agent or component or layer or a teleoperator processor, then the vehicular AI agent or other processor may also examine the available communication connection or connections and their performance (e.g., latency, bandwidth, good-put, throughput, error rate, reliability indicator(s), or the like) at that particular point in time and potentially in predictive forward time window or in a forward time-interval. It may then decide, for example if the weights of transmitting stream A is not "high enough" over stream B and C, that instead of transmitting just stream A, because there is not enough bandwidth at sufficiently low latency and sufficiently high reliability from one or multiple communication connections bonded together or utilized in concert, that it prefers to transmit streams B and C instead, because it is more certain that they would arrive at the IP destination or destinations, because the impact of receiving both streams B and C is higher than receiving just stream A, or for both reasons, or for any other suitable reason. It may then transmit stream B over a bonded communication link or over a virtual connection consisting of two or more particular modems or transceivers (M1 and M4) and may transmit stream C over a single modem or transceiver M2, leaving another modem or transceiver M3 unused for time-critical data or reliability-critical data at this point in time because its monitored performance is insufficient or inadequate for some or all of the information types. The next moment this may change, and the vehicular module may decide to use a different combination of modems and/or transceivers (such as M2+M3+M4) for transmitting stream A and also may still be able to transmit stream B over the combination of modems or transceivers M 1+M2 (for example, modem or transceiver M2 is being used in this example for transmitting both types of information).

In some embodiments, it may then decide whether or not it can accommodate all the information to be transmitted within the capacity and the abilities of the current connections and their quality, in view of estimations or calculations done by the Communications Properties Estimator 141. If not, it may consult with the AI module 119 whether a different format for some or all of the data is adequate or sufficient. For example, the AI module 119 may determine to more strongly compress the current real time video feed and/or the feed from the previous seconds in higher compression, or to have and transmit a sparse processed representation of the images in the previous seconds, or to transmit the data by any other lower-quality transmission options in order to accommodate transmitting of relevant high priority data over the existing connection(s) and their current or estimated or predicted quality; and accordingly, the Dynamic Encoder/Modifier 143 may operate to perform such data compression or data dilution or data size reduction. For example, some data may be defined as data that should or must be sent in very low latency such that additional processing of such data may be irrelevant partially or completely; or that if such one method of processing takes lower latency and yet results in sufficient low enough bandwidth to be accommodated within the available connections and their momentary or predicted performance, then such processing may still be done.

In some embodiments, processing of the data may be done in parallel so as to save time and/or to reduce latency, according to the AI component decision or prediction of the future upcoming data and its expected weighted assurance probabilities. The AI module 119 may command additional processing to start or stop accordingly to these learnt predictions, to be done in accordance with certain quality level(s) or set of parameters, to stop, to change the parameters for compression or encoding, or the like. For example, when the AI module 119 identifies an object with a certain set or single assurance or probability indicator which is too low, or a trend of reduced probability indicators over relevant time or unstable or fluctuating in certain degrees (absolute or relative) indicators over relevant time (derivative or another mathematical method), it may decide and command a video encoder to start a new encoding scheme by using a second set of encoding parameter which is intended for a lower yet "good enough" or sufficiently good video stream so that if the available communication performance is too low, this new lower quality stream may be selected for transmission instead of the less compressed stream. Then, it may decide to stop this second encoder, when for example the object or scene certainty indicator become high enough and stable enough.

In another example, the AI module 119 may instruct a video processing component to provide a sparse representation of the image or the video in full or in areas of interest or of some specific objects, whereas such representation may be generated by sets of pixels of different numbers, of classified objects, specific digital signatures, 2D or 3D, different resolutions, or other representations. Each representation may have an indicator associated with it, produced by the video processing or analytics or representation processor indicating the level of sparseness or of assurance. The AI module 119 may learn or predict in advance at high enough probability level that a certain video processing or sparse presentation is desired or sufficient for the specific scene, or object, or vector, or movement or any other criteria. may factor-in the weighted probability of the classified or identified or predicted object, or vector, or scene, the weighted probability of the importance to arrive at a higher level probability for that item, the assurance or probability of that item when the results of the video processing or AI processing of the video is combined with information from other sensors—either at the raw data level or at the processed data level or at the conclusions or prediction or probability level, the assurance indicator of the other objects, the importance of that object to the overall scene or to the tasks at hand such as of the dynamic driving or road hazards or safety, or any other suitable or relevant information.

In some embodiments, with AI and machine learning, the exact decision algorithms by which a machine arrives at a conclusion may be unclear and/or irrelevant. Rather, the prediction is given with a certain indicator of the probability or certainty of its accuracy. The present invention uses this indicator of probability (or certainty) or other threshold or decision criteria or algorithm as a parameter for additional machine learning or decision-making process(es), which may occur in parallel to the initial one, that determines which information and at what quality and format, shall be transmitted and shared with which other AI component(s) or module(s) n the system. Then it may selectively transmit the relevant information or data-segment, on or via the relevant connections or channels or communication link(s) according to the priorities and while matching between information streams or bursts and each connection's actual momentary performance or predicted performance.

All or some of these decisions may be made by the system based on pre-configured algorithms, and/or according to the AI component learning over time using machine learning methodologies, with or without heuristics, with or without local human intervention or remote human intervention, in combination with the learning and/or results of the learning and training of other AI components or layers of the system.

In some embodiments, the vehicular AI component or module, and/or the remote AI component or components or module(s), may adaptively learn which information types are relevant for decision making and/or have the most impact on remote tele-operation or remote tele-driving procedures or assisted driving, or on how quickly and safely and most effectively overall can a remote human or a remote AI tele-operator transit from its idle mode to a full control of remotely driving the vehicle from a remote location. Similarly, the matching between communication connection(s) or a multiplicity of them with the information type or stream, and with its digital representation, format, quality, sparsity, and/or metadata, may have similar impacts on the effectiveness or safety or latency or other parameter of a human or AI remote teleoperator taking over a disengaging vehicular AI-based driving. The various options are given or allocated weights, they are prioritized or ordered, and they are ranked so that the whole scale of options may be considered (or up to, or down to, a certain level). The importance, impact and effectiveness of the transmission of the streams of data, and their matching to being transmitted over parametric communication connections—single or bonded or duplicated or others, may be learnt or given heuristically or a-priori configured also according to scenes, or scenes types, or other objects in the scenes or predictions related to the scene.

For example, when the road is clear and there are no on-coming traffic, then a certain relatively-low level of assurance or probability or certainty of an object in the road or on its side may be decided to be sufficient and/or to have less importance, for example, compared to a situation when on the same road there are many oncoming or other traffic vehicles, and/or also depending on the vehicle or other vehicles or objects speeds, movement vectors and directions, trajectories, and/or other conditions such as time of day, night-time, visibility level, weather conditions, presence of rain or snow or fog, ambient light levels, the speed at which the vehicle is currently travelling, and so forth. For example, in the no-traffic case, the vehicular AI component may decide to still keep transmitting a sparse or reduced-volume or reduced-size or diluted digital representation of that low-probability object to a remote AI component and/or to a remote teleoperator or multiplicity of such; whereas in the second case, when there is a lot of traffic and/or there are a lot of objects to analyze, the object on the road with the low probability identification or other feature may now be assigned a high importance and the vehicular AI component may decide to bond together available modems (or transceivers) M1 and M3 and transmit or upload a compressed video on or via this bonded virtual connection, while also streaming or uploading sparse representation of LIDAR-captured data or other data on bonded modems (or transceivers) M2 and M3. In some embodiments, the vehicular or other AI components may learn to distinguish between such cases, to select the relevant transmission options according to the information to be transmitted and the options of transmitting other types of information or other representations of the same information or other formats of such. Such learning is made possible when at least some of the sensory information is continuously transmitted to the remote destination so that the remote destination teleoperator or AI component may check its predictions according to the later stream data coming in, even if that is not a full representation of the raw sensory data.

The AI vehicular entity or component, such as the AI module 119, in addition to its function as part of dynamic driving of the vehicle, may also decide what sensory information to transmit or upload and/or in which format and/or with which type of compression and encoding and/or over which modem(s) and transceiver(s), as well as deciding similarly with regard to transmission or uploading of a partial subset of it, a diluted sparse representation of it, a post processed data from it, one or more processed decisions based on it, or any other representation of any part or subset or complete or fused part of the sensory collected data or of the decisions or predictions or metadata it calculated.

In some embodiments, a subset of the sensory data or the sensed data or the measured data that is collected or captured or acquired by or in the vehicle may be shared with the remote processor or processors (or the remote AI modules) over time. This may be done with, or without, regard of the immediate assurance or probability or certainty indicator or the trends of change in their quality or any other function of them. The start or stop or duration of such sharing may also be independent of the assurance indicators quality. The quality and format of the shared data may also be independent of the assurance indicators quality. Each of these parameters may change dynamically over time, or may be static and pre-configured. The AI component or module in the vehicle and/or within any other component in the network may learn and/or predict when to change each of these parameters according to the results, the probability level, the scene, the communication connections performance, geo-location, time of day, day of week (e.g., weekend versus weekday), cost of local processing or of remote processing or of communications, weather conditions, ambient light conditions, vehicular traffic congestion conditions, visibility conditions, the task at hand, or usage target or other target function or optimization function, or any other parameter that a supervised or an unsupervised machine learning may use for this purpose.

For example, when a teleoperator (or remote driver, human or AI-based) may be used to potentially intervene with an autonomous vehicle driving to take control of the dynamic driving in part or in full or to send commands or waypoints or other navigation or destination or driving instructions to it or approval/confirmation to an AI-planned route with or without changes to it (or, with modifications to it), at emergencies or unlearnt or low probability situations, the latency of intervention, the accuracy of intervention, and the reduction of the "surprise" factor and/or of the non-alertness and non-conscious state of the remote driver in relation to the specific machine should be reduced. Especially when such remote driver may be supervising several such autonomous vehicles and should be ready to intervene with any of them, or when the rate of intervention caused by disengagement of the autonomous vehicle driving system is low such that any such intervention comes at a surprise to such remote driver. The system thus uses at least one communication connection to transmit relevant presentation of the relevant sensory data to minimize the latency at which such teleoperator may take over the vehicle. Instead of the vehicle AI component starting to transmit the relevant representation when the required moment of disengagement comes, it transmits a potentially different set of representations of potentially different or same sensory of predictive information before the moment of disengagement and of remote intervention comes. For example, it may continuously assign a relatively high priority, but not top priority, to a sparse or diluted or partial subset of the information or their vectors and therefore continuously transmit it over other less prioritized items. The remote component shall be able to display this sparse representation in a way sufficient for the operator to be able to take over the dynamic driving of the vehicle at any chosen level of certainty or probability or clarity.

For example, the vehicular AI component may decide to transmit or to upload only a highly encoded (meaning strongly compressed, resulting in low volume of streamed bitrate) video feed of the front camera. Since the required bandwidth is sufficiently low, it may transmit it over any cellular or V2X connection continuously. Still, it may be enough for the remote teleoperator to take over the vehicle dynamic driving at any point in time at the latency (delay) of the transmission from the disengagement or of the event, rather than at the latency (delay) of the transmission plus the latency (delay) of encoding or other processing of the sensory information. This transmitted information of sparse representation of the actual sensed surrounding or internals of the vehicle may be graphically presented to the teleoperator so he may feel as if he is the driver, at least to some extent, at any point in time. The details of a car coming from the other direction may be less important than the actuality and "block"-size sparse digital representation or a highly compressed video of this car, so that the teleoperator may take over instantaneously and start sending driving commands from his remote driving set (wheel, brakes, gas and/or electric power level data, or any other) at a minimal latency.

In some embodiments, the remote driver or remote AI module may send back to the in-vehicle AI module, over the single or bonded communication link(s) or channel(s), using unicast or multicast or broadcast over one or more of the wireless connections, the driving instructions one after the other or in series, or batched or grouped together. For example, if the first way-point or destination is clearly identified, such as to the road shoulders to avoid or remove a hazard, then this waypoint will be sent quickly to the vehicle. Later points in the sequence, or out of sequence, may be communicated or sent or transmitted later, together as a group or batched, or again one after the other. The waypoints or driving instructions may be sent when the vehicle is stopped and/or during its driving, either by the in-vehicle AI or by the remote driver or remote AI, or otherwise. In some embodiments, optionally, several options may be sent to the vehicle, rather than a single deterministic set of commands; so that the in-vehicle AI may dynamically choose at each point in time from that set of provided waypoints or other instructions, the most relevant next point or command according to the developing or evolving or dynamic conditions. These multiple instructions may or may not be prioritized by the remote driver or remote AI unit; may or may not be dependent on one another or on external conditions (e.g., using operators such as "if" and "then", or "when" and "then", and using Boolean operators such as AND and OR and NOT, or the like; such as, "if the brakes are responsive then brake immediately; if not then trigger the emergency hand-brake and lower the gear"). Optionally, a remote driver may interact with a remote AI and then the resulting instructions may be sent to the in-vehicle AI module. In some embodiments, these operations may depend on the quality of the video uplink transmission, or the uplink transmission at large, because a better quality video, for example from more cameras or at a higher frame rate per second or at higher resolution, may result in a higher confidence level to perform from remote, or command the in-vehicle AI to perform, or may enable to initiate a higher risk maneuver; whereas a lower quality communication or video or images may enable to system to enforce or advise only a more limited maneuver or driving commands. The quality may be composed of the quality of the total of all the bonded modems or transceivers, or any subset of each; and the quality indicators may include the available bandwidth, goodput, through-put, latency, delays, error rate, rate of missing or lost packets, rate of erroneous packets, or the like.

In some embodiments the in-vehicle or remote AI may plan a route yet require a remote human teleoperator approval of it, with or without changes to it. For example, if the AI-planned route involves law or regulation violation. Then the remote teleoperator may use the sensors to gain understanding or confidence of the AI-planned route, approve it or make changes to it such as by moving a route line on a touch screen or marking new/delete/change way points or disapprove it altogether, or wait till conditions allow it and then issue the approval or otherwise interact with it and/or with the vehicle systems and/or with the AI module. Using the bonded modems increase the quality of the sensory information, hence increase the remote teleoperator confidence and understanding of the situation. HE may also direct the vehicle sensors such as cameras to better point at obstacles or areas of interest. The AI that planned the route may direct the sensors in order to allow the remote teleoperator what it considers a best/optimal view, which may be different than the view/angles/directions of the sensors when in motion or for other needs. For example, the AI module may point a side camera to look directly into a side object, or a side street or turn. Or one of the front-looking cameras to look sideways, even at a small angle change, into a turn or a side street or a junction. Or to zoom on an obstacle, or escort the movement of obstacle such as pedestrians or others.

In some embodiments, the vehicle is further equipped or associated with multiple physical connections, or modems or transceivers. For example, it may be associated with three cellular modems that are operable via 1 or 2 or 3 different operators. Each of these connections, or modems, may be experiencing different performance at any point in time, for example in terms of available uplink bandwidth, uplink latency, uplink error rate, jittery behavior of any of them, downlink performances, bandwidth, goodput, throughput, general error late, or others. It may also be associated with a V2X DSRC 802.11p modem or transceiver or connection, or more than one, or with another V2V modem or transceiver or connection, or satellite modem or connection or transceivers, or others.

The vehicular component such as the AI module 119 may decide to continuously or as much as possible or needed, transmit a sparse or diluted representation of said sensory information or results of calculations and processing of such, using the multiplicity of these links or connections. Such usage may be done for example in one of the following ways.

(I) It may transmit the sparse representation via one selected connection. The selection may be done according to rigid parameters such as performance, or according to an AI learning and training of the best connection to transmit on at any point in time and other conditions.

(II) It may transmit the sparse information replicated or duplicated over a subset multiplicity of the connections. For example, in order to increase reliability that every packet passes through, when there is no higher priority information to be transmitted on any subset of these connections.

(III) It may transmit a different set of the information over multiple subsets of the available connections at any point in time. For example, the strongly encoded video feed from a front camera split dynamically between connections A and B and C bonded together into a single virtual connection and the sparse block representation of objects from the right hand-side camera split over bonded connections B and D. Using which connections for which information may change dynamically by the system. When the performance is insufficient, or predicted to be insufficient, the component or AI module 119 may change the information it transmits by dropping part of it, by commanding the processors to dilute or encode if stronger (e.g., into fewer bits), by rescaling or resizing or size-shrinking captured images and/or captured video, by skipping a frame of a video stream every K frames, by skipping every Nth frame of a video stream, by using a lower bitrate for video encoding and/or audio encoding, by reducing sampling frequency, by utilizing an encoder or an encoding scheme that yields smaller data size, or to perform any other change.

(IV) It may transmit a more strongly encoded or diluted representation on a single connection A, and a mid-sparse representation of same or different subset of the information on bonded connections B plus C, and the least sparse, yet perhaps still sparse, representation of same or different set of information, or predictions, on bonded connection C plus D (C is intentionally not mutually exclusive in this example).

(V) It may transmit any subset of the information or the predictions or the processed information or the representation of such to several different IP addresses using any combination of any subset of the multiplicity of connections. The selection of which connections are used for each transmission segment of which information may change dynamically, as well as the method of transmission (bonded, duplicated, single connection or other). In parallel to the transmission of said information, on any subset of the used connections, other information may be transmitted or received; for example, infotainment or entertainment related packets, geo-location data, telemetry, mapping information, road traffic information, route guidance information, or other less important or lower priority packets.

(VI) It may transmit the same or different set of data or processed data over each of the A and C connections, either to the same IP destination or to different ones. It may select connections A and C because these are the connections with the lowest momentary latency, or the highest bandwidth or lowest error rate or most stable or the lowest cost or any combination of these or other parameters. It may transmit other types of data, related or non-related to each other, over these connections too. In subsequent moments, based on monitoring the performance of each of the links or per predicting their performance or otherwise, it may decide to switch to connections A and D, or to add another connection E over which to duplicate the same set of data or transmit a different set, or any other change in the connections being used.

(VII) It may decide to transmit the sparse classification representation via connection A bonded with connection B, and to also transmit a very low-bit compressed representation of the side camera video over connection C, and then later change the connection utilization according to their fluctuating or predicted fluctuating performances.

In some embodiments, it may transmit the information in unicast to any specific IP destination or address or recipient, or may multicast it or broadcast it. For example, when it wants to share sparse information or not sparse information with AI components in its vicinity and/or with infrastructure and/or transmit them to a multiplicity of potential teleoperators that may potentially intervene in case of vehicular AI disengagement, it may broadcast it over the 802.11p or another flavor or version of DSRC or V2X connection in parallel to unicasting it to a specific IP address of a specific remote teleoperator.

In some embodiments, there may be multiple remote teleoperators and/or multiple remote AI components or hierarchies or layers. For example, in some embodiments, the vehicular AI decides to transmit to two different teleoperators using the same bonded virtual communication link using for example connections A plus B plus C. This may be done using multicast and/or a Virtual Private Network (VPN); or, for example, this may be done by replicating the transmitted data or parts over two or more of the available communication links or connections, separately unicasting it to the different destination IP addresses of the different receiving teleoperators. The two (or more) remote teleoperators may receive the relevant information at different performance characteristics, such as slightly lower or higher latency; for example, the first tele-operator may receive the data at a first latency and at a first error rate; whereas the second tele-operator may receive the data at a second (e.g., smaller) latency and/or at a second (e.g., smaller) error rate. Additionally or alternatively, one teleoperator may already be busy handling other tasks or even remote-driving another disengaged vehicle. Any one of the said teleoperators may take over the disengaged vehicle. Alternatively, a remote AI module may take over from the human tele-operator, or vice versa, or the two may interact wherein the remote AI advises the teleoperator about the alternatives or recommends options to it, or the human operator alleviates potential risks or limitations so that the remote or in-vehicle AI unit(s) can then continue with the route planning alternatives or recommendation or actual driving. For that purpose, synchronization or another type of coordination between the teleoperators and/or between the teleoperators and the vehicular AI component or vehicular processors and/or via another entity (e.g., a central AI component or layer) may be done, for example, via timestamps, IDs, packet IDs, a control channel, a feedback channel, a feedback loop, codes, control messages, transmission and reception of acknowledgement (ACK) packets or codes, transmission and reception of Negative Acknowledgement (NACK) packets or codes, collision-avoidance schemes, ordered list of priorities or prevailing rules, and/or other means. The vehicular AI may identify which of the allowed remote teleoperator becomes its designated teleoperator, and may then discard or disregard commands received from other one(s). In some embodiments, the vehicular AI module, or a central/remote/external AI module, may be the module that determines (in advance, or in real time during the disengagement process) which particular tele-operator, out of two or more possible or relevant tele-operators, would take-over and perform the actual tele-operating of the vehicle upon disengagement. The decision may be reached by taking into account one or more parameters or conditions, for example, current or historic or predicted or estimated or actual quality of communication with each candidate tele-operator (e.g., latency, delays, error rate, Quality of Service (QoS), bandwidth, goodput, throughput, reliability of connection, or the like), the current or predicted or estimated workload of each candidate tele-operator (e.g., a tele-operator that is already remote-driving another vehicle, may be defined as less preferable over another tele-operator or remote AI that is not currently remote-driving another vehicle), a pre-defined order of priority (e.g., defining that if tele-operators A and B and C are all available, then the vehicle owner or the vehicle maker or the system administrator had defined that tele-operator B would be selected), and/or other suitable conditions or criteria or parameters. In some embodiments, potential teleoperators may exchange information in real time to make this decision between or among themselves. In some embodiments, the teleoperator that takes control, using any decision making process or default decision making process, may inform the others and/or a central entity or location, the vehicular processors and/or other entities, using communications, human UI means, or others, and may continue interactions with such.

In some embodiments, the remote teleoperator or multiplicity of such tele-operators may be or may comprise learning machines, or other AI components or AI layer or AI hierarchy. Each one of them may be congested or occupied to a certain degree in terms of computational or connectivity or cost or other resources. Further, each one of them may be implementing a different method or algorithm or tuning parameters, or may have a different experience or expertise (e.g., machine that is expert with rainy conditions; machine that is expert with night-time or low visibility conditions; machine that is expert with road hazards; or the like), and therefore may have different training and decision results. Hence, each one of them may react differently to the situation; some may perform better in some situations, and other may perform better in other situations. According to the transmitted and received information, and to their experience and expertise and level and capacity, each AI component may rank itself as to how well it estimates that it can handle the situation. The vehicle AI component, or another AI component, or between them, a relevant AI component may be selected or pre-selected by default, or by being the quickest to respond, for the remote teleoperation. For example, tele-operator A may indicate that it is particularly experienced or trained to remotely drive a vehicle in rain conditions; whereas tele-operator B may indicate that it is particularly experienced or trained to remotely drive a vehicle at night-time; whereas tele-operator C may indicate that it is particularly experienced or trained to remotely drive a vehicle that have malfunctioning brakes; and the selection of the particular tele-operation may take into account which one of these (or other) parameters or conditions hold true for the particular vehicle that requires disengagement and remote-driving.

In some embodiments, the decision of which remote assistance is provided at each point in time may also depend on the quality of the connection to or from the vehicle and or other vehicles in that vicinity. For example, if the uplink video quality of the bonded or single link (e.g., in 5G communications) is limited or is worse in any respect, then a remote human tele-operator may be alerted and take control. Whereas, if the video or data uplink quality (e.g., taking into account latency, reliability, error rate, bandwidth, and/or other parameters) is supportive enough, a remote AI may take control. This may operate in a tiered model; such that, for example, firstly the remote AI evaluates if it can serve that instance, reviewing the conditions including the communications conditions as reported by the vehicle or as derived from the quality of the received data, and then, if needed, it hands over the case to the remote human teleoperator. In case communications conditions change, for example, the bandwidth drops below a threshold value or the video frames per second or resolution or details-in-the-image drop below threshold values, then the remote AI may alert the human tele-operator and hand the case over (e.g., back to the AI module). In case the communications conditions improve, or the critical obstacle that prevented the local or remote AI from handling case is removed or is traversed by the remote human tele-operator, then the situation may be handed over to the remote AI or to the in-vehicle AI. Using bonded communication of multiple links provide the reliability, video quality, bandwidth, low latency or stable low jitter behavior, more cameras, more other sensors, or the like, which allows this economics of scale in having more remote AI handled cases and less humans in the loop, or improved and more efficient (shorter and more reliable and effective) human handling.

The above-mentioned operations may be controlled or handled by a Multiple Tele-Operator Handling Unit 147, which may be a vehicular unit within the primary vehicle 110, or may be part of remote server 170 or may be implemented externally to the primary vehicle 110. For example, the Multiple Tele-Operator Handling Unit 147 may determine and/or perform and/or instruct one or more of the above-mentioned operations, such as, which data-streams or data-sets or data-segments to send to each one of multiple remote tele-operators; which remote tele-operator is better suited or is best suited to handle which particular situations or scenarios; which tele-operator or which tele-generated command would be the prevailing one in case of a conflict or inconsistency or anomaly or abnormality or contradiction or mismatch or duplication among decisions or commands or among expected results or among derived operations from two or more tele-operators; and/or other suitable determinations or decisions, which may be performed based on a pre-defined set of rules, or based on a pre-defined lookup table of priority order, or by based on the certainty level that each one of the multiple sources (of inconsistent commands) associates with its command (e.g., selecting the command that has the highest level of certainty associated with it), or based on other considerations that the vehicular AI unit may utilize for this purpose.

In some embodiment, a first layer of AI, the one that has for example the lowest latency and/or other local benefits, may take over the disengaged vehicular dynamic driving first. For example, an AI component that is run by the telecom or mobile operator eNodeB or Wi-Fi hotspot—at the edge. This AI component may provide "first aid" or "first response" actions, such as immediate handling of immediate accident hazard. Further, it may provide additional or other AI expertise and processing of the data being received by it, for example according to its past learnt experience and training. It may then "consult" or check with a higher or different layer of AI component, or pass the additional processing results or predictions and probabilities to the vehicular AI component or to any other AI component being involved in this process. Such other AI component may be more adequate or capable to manage the situation and in a synchronized or unsynchronized way take over and send the relevant instructions to the vehicular AI component or to the vehicular driving processors. Such learning may be done in a non-supervised machine or mode or technology, as it may continuously check the received input against its decision and the new input coming later, which may be used to validate or invalidate or enhance or otherwise positively or negatively reinforce the learning.

In some embodiments, the telecom or communication operators may run at their edge nodes or in their core AI components overlay that interact with each other. These AI nodes may receive information, raw or processed, from the vehicles within their physical geo-location coverage area, from vehicles about to enter these areas, from the infrastructure sensors such as cameras on traffic lights or other sources. They may then continually provide "AI escort" or "AI chaperon" to the vehicles under their service, in a priority order when resources are insufficient to manage or escort all. If AI component are implemented at the edge node, such as Wi-Fi access point (AP) or eNodeBs of a cellular network or other; then when a communication handover is performed, or soon before or after, also the vehicle's AI-state representation may be handed over from one such handling or escorting node to the other. This may occur when the vehicle is not teleoperated, as well as while it is teleoperated—either by the node AI component or by another AI component in the system. This handover may be done via exchanging signals and/or data and/or referrals to a data aggregator or to a central entity or a central AI module. The geo-areas of coverage of an AI node may or may not overlap in part or in full with the telecom or mobile-com coverage areas of the wireless nodes.

For example, when a vehicle moves from one AI node to another, it may not necessarily need to switch communication connections or establish new ones. However, when a vehicle undergoes a communication handover, its connections including with the AI agents or components may usually be maintained via the new telecom node or by both the old and new during the transition period. However, at these points, as well as at other difficult communication points such as cell edges or lower grade service or lower coverage or more users or other, lower performance might be experienced for the delivery of the data to the remote teleoperator or remote AI agent or layer. In some embodiments of this invention, layered AI paradigm may assist in that as the local communication node, or AI node, may provide first level of teleoperation or of AI processing. The remote, potentially stronger or more capable or more experienced or learnt AI component or human teleoperator may take control in a secondary manner, partially or in full.

In normal operation where the vehicle is self-driving and if the first layer of AI component monitors its thinned-down representation of the driving, it may handover this to the next node in the expected or known geo/road route. It may identify potential hazards in advance and alert the vehicular AI and/or the higher hierarchy AI component or agent, starting to transmit to it the data ahead of the predicted event that may or may not occur, request or instruct the vehicular AI agent to enhance the data delivery—raw or processed, to allocate more radio or access or QoS slices other communication resources or ask the relevant network allocating elements to do promptly so that the additional information from the vehicle may be transmitted safely and at a higher and more guaranteed QoS.

In some embodiments, having many multiple remote teleoperators, including potentially authorized and trained AI machines or humans or even a crowd of humans, may involve a higher complexity of algorithms for deciding which takes over, or still the vehicular AI agent or driving processor may decide according to which responded quicker or has the more bandwidth to/from or other communication results criteria or ranking of the teleoperator himself according to capacity and past performance in general or relevant for this specific scene or case, or any combination of.

In some embodiments, AI agents or components or layer or any of the AI module(s) may train itself or learn from the transmitted data from the vehicle. Such learning may be unsupervised as the ongoing stream of data shows current flow and then future (which becomes actual) flow, which can be compared with the prediction based on the current and past. This can be done on an ongoing basis, or not necessarily just for emergencies, since the data stream keep flowing towards such AI modules for analysis. Optimization and target functions may be for object predictions, vector movement predictions, communication prediction, transmitted data efficiency for various AI decisions or targets such as when transmitting some types and qualities and formats of data and then others and learning the impact each transmission has on the quality of the results. Further, in some cases, several different types of data and/or of qualities and/or of formats may be transmitted in parallel—of the same scene. They may be transmitted using the same communication connection(s), bonded or single or multiple, or over different ones with generally similar (or different) momentary performance characteristics.

When using bonding or aggregation of multiple communication links or modems or transceivers, some of the transmissions may be of high quality/less compressed/less sparse representations of the same view or data. Then, the remote AI component or layer or hierarchy may perform calculations on the different received streams, and may compare the quality of the results when compared to the later incoming actual stream. This method for on-going unsupervised training may expediate and improve the quality of the AI components continually and quickly.

In some embodiments, the process of transmitting the information or the sparse part of it, the selection of which AI or human teleoperator takes over, what commands are being sent or other parts of the process, or other operations, may optionally use blockchain technology via a Blockchain Control Unit 177, in order to store or record data, to transact decisions (if not time pressured as current blockchain is not designed for microsecs real time contracts), to ensure data integrity, to make data (or part of it) available as a blockchain data-structure to AI modules and/or to machine learning modules and/or to auditing modules and/or to regulators, to enable untampered logging of data and/or of tele-operating transactions, to authenticate participating components, to authenticate sensed data and/or processed data, to record share and process points-of-interest in the process, to democratize or commercialize any part of the remote assisted driving or the autonomous driving data processing or the data gathering for tele-operating process, and/or for other purposes. Accordingly, a blockchain based data-structure constructor and updater may operate, in the vehicle and/or externally to the vehicle (e.g., as part of Blockchain Control Unit 177), and may manage the construction and the subsequent updating of such blockchain of data related to self-driving, remote-driving, tele-operation of vehicles, local or distributed AI data or decisions, and/or other related data or parameters.

The AI modules or components in the network or in the central AI module may sometimes experience more data traffic than the single vehicle does. Therefore, and/or due to other reasons such as resources availability, it may sometimes be able to better and/or more accurately respond to various particular scenarios. It may use the multilink connection with the vehicular AI to download into it at a higher rate the most advanced or more updated AI training on-the-go or when it is parked or non-moving (e.g., waiting at a red light near a coffee shop that has a public Wi-Fi access point). It may use these downlinks, when not in use or when prioritized higher, to further train the vehicular AI component. The bonded multiple links may provide both the bandwidth, and the reliability and availability for such downloading or training to be the most effective and quickest, so that the vehicular AI may be the most updated in the quickest manner. Further, in some embodiments, any authorized AI component or agent in the layer may download or may transfer into the vehicular AI agent the view, either physical or representation of or processed decisions based on it, as experienced by other vehicles in the system such as the on-coming ones, or vehicles going in the same direction but ahead of the vehicle, or pedestrians, or infrastructure (e.g., traffic signal), or as processed by the other AI agents. The vehicular AI agent may use this downloaded or streamed or received data to reinforce its own decisions or to make new ones.

In some embodiments, an AI layer with multiple nodes may interact with the vehicular AI agent and driving processors, and with the telecom or mobile communication network in order to best coordinate in advance or during the process relevant resources for the remote teleoperation.

Some embodiments of the invention comprise devices, systems, and methods of vehicular multi-layer autonomous driving, of remote tele-operating of vehicles, and of self-driving and autonomous driving of vehicles, optionally utilizing distributed Artificial Intelligence (AI) and/or multiple AI modules or distributed AI architecture. For example, a vehicular (in-vehicle) unit comprises implements a first layer of artificial intelligence, mainly but not solely, for autonomous driving. A second unit with a layer of artificial intelligence may optionally exist and operate at the edge nodes of a communication network infrastructure, such as at the Access Points of a Wireless LAN (WLAN) network, or a eNodeB of a 4G or 4G-LTE or 5G or 3G cellular network, or at the core of such networks or at the access nodes of such networks. Another layer of artificial intelligence may optionally exist and operate at remote computing devices such as in a cloud, in a command and control center, at the home or others, including multiple such locations. The multiple AI layers communicate with each either, pre-process and post-process data that is fed or transmitted or received or exchanged or shared via one or more communication connection(s) between them, exchange decisions, suggest decisions, perform predictions and estimations between them, for the safe continuous and cost effective movement and/or operation of the first vehicle and/or of others, providing layered hardware and software and operational redundancy for autonomous driving, thus increasing the safety, speed, efficiency and availability of such autonomous driving, and with the delivery of relevant selected sensory data or sensed data such as diluted or compressed video or AI representation of such, also allowing for a remote driver, or multiplicity of such, to take control of the autonomous vehicle instantaneously as the data (e.g., including video) is available to them at most times.

In some embodiments, a self-driving vehicle or an autonomous vehicle may continuously or intermittently upload, or transmit wirelessly in the uplink direction to one or more remote recipients, sensed data and/or captured data and/or acquired data (e.g., camera feed, audio feed, microphone feed, video feed, location information, vehicular speed, vehicular acceleration or deceleration data, LIDAR data, information collected or sensed by other sensors, or the like), on a generally continuous basis (yet sometimes with potential interruptions, disruptions, stoppages and resuming, or other errors or delays, which may be intended or not-intended), and optionally in a compressed or encoded format or in a small-size format or a diluted format (e.g., skipping every Nth frame of a video) or in a reduced-size format (e.g., resizing or cropping a larger image into a smaller image for uplink transfer); thereby enabling a remote tele-operating system and/or to a remote tele-operating module or person to respond rapidly and efficiently to a disengagement event, and to shorten the Response Time of such remote tele-operator (human and/or machine-based) since at least some of the information that is immediately relevant for taking over the operating or driving of the vehicle is already available at the remote tele-operator location from such previous, ongoing, wireless uploading of data.

In some embodiments, edge nodes or edge-based services or near-edge in terms of IP-based connectivity (fewer hops, lower latency) or in terms of geolocation of cellular communication networks and/or cellular providers and/or communication service providers, may follow or escort or chaperon the vehicle as it travels and may provide remote AI services to such traveling vehicle, and particularly as the vehicle traverses from one cellular communication cell to another cellular communication cell; thereby ensuring a continuum of generally uninterrupted or low-interrupted or reduced-interruptions AI support services to the traveling vehicle; and such that a first edge node or cell may transfer vehicular data or vehicle-related data to a nearby or subsequent edge node or cell in order to ensure and enable such continuum of AI services. In some embodiments, multiple such edge or near edge nodes may thus virtually chaperon or virtually escort the traveling vehicle, coordinated or not-coordinated among them, at all times, or when appropriate according to risk analysis or learnt experience or availability of resources, they may provide additional reliability redundancy coverage and AI power and experience for various conditions and scenarios. This may further enable rapid response and rapid intervention by an AI module of such edge service or edge node, since the uploaded data packets need reach a remote recipient and/or need not need to traverse long distances of the cellular network but rather merely need to reach the nearby edge service node, enabling such edge service node to provide AI support and tele-operating service to the vehicle in a disengagement event, at least initially and/or on an urgent basis.

In some embodiments, a particular vehicle or autonomous vehicle or self-driving vehicle, may be associated with two or more remote tele-operating systems, and may be able to communicate with them (or, with each one of them) via wireless/cellular communication link(s); and such two or more remote tele-operating systems (which may include machine based vehicular operators and/or human vehicular operators) may be defined as possible candidates to take-over the vehicle and to remote-drive or remote-operate or tele-operate it upon disengagement or if one or more pre-defined conditions hold true.

For example, a vehicular (in-vehicle) selector module, or an extra-vehicular selector module (e.g., located externally and remotely to the vehicle, such as at a central server or a central communication hub or a central AI module) may perform the selection or determination of which particular candidate tele-operating system, out of two or more such candidates, would actually be selected and would be assigned or allocated the task of tele-operating when needed or when desired to do so. The selector module may take into account a set of parameters, conditions and/or criteria for this purpose; for example, the current or actual or predicted or estimated or historic characteristics of the communication between the particular vehicle and each such candidate (e.g., communication bandwidth, throughput, goodput, latency, delay, error rate, reliability, signal strength, Quality of Service (QoS) of transmission and/or reception), current weather conditions and environment conditions (e.g., a particular tele-operator may have specific experience to operate a vehicle traveling in snow or in fog or in rain), current geo-spatial parameters (current location, speed, acceleration), current time (e.g., a particular tele-operator may have specific experience to support vehicles at night-time, or during rush-hour), current day-of-week or date (e.g., a particular tele-operator may have increased resources or reduced resources during weekends, or during holidays), road data (e.g., a particular tele-operator may have or may lack specific experience for remotely operating a vehicle in a mountain road or in an urban area or in a serpentine road), the current or estimated work-load or computational load at each such candidate tele-operator, the number of other vehicles that are currently being tele-operated or monitored by each candidate tele-operator, the current or recent response time(s) exhibited by each such candidate tele-operator, a pre-defined priority order of tele-operators that was pre-defined by an owner of the vehicle and/or by a maker of the vehicle or by a system administrator, and/or based on a weighted formula that takes into account a weighted combination of some of the above-mentioned parameters.

In some embodiments, such selection may be done passively or semi-passively, for example, by selecting and/or utilizing the first authorized teleoperator from which the commands arrive at the vehicular processors. Optionally, teleoperation control may be handed-over from one entity or remote controller to another, human and/or AI-based, according to decisions based on the listed parameters or others, over the course of the operation. Human intervention may be applied to impact this process in real time or in advance. Such handing-over of the tele-operating may be synchronized or defaulted, or may be performed automatically if one or more conditions hold true (e.g., automatic hand-over of the tele-operating from tele-operator A to tele-operator B if night-time is reached, or if it starts raining or snowing, or if the vehicle moved from geo-region C to geo-region D, or if the computational or other burden at teleoperation A reaches a pre-defined threshold value or a maximum allowed level, or the like).

In some embodiments, a vehicular computer or vehicular processor or the vehicular AI module 119 may utilize AI and machine learning not only for purposes of identifying objects and route-related items (e.g., other cars, traffic lights, traffic signs, lane borders, pedestrians, road blocks, road obstacles, or the like); but also in order to learn which types of data to transmit or upload to remote AI modules, and/or which compression or encoding or data dilution or sparse representation process to utilize, and/or to which extent to dilute or to encode or to compress or to skip data or data-items, and/or to determine which data originators (e.g., which sensors or cameras or LIDARs) to include and/or to exclude from such data transmissions or data uploading, and/or which amount of data and type(s) of data are sufficient to upload or to transmit in order to enable a remote AI module to reach decisions at a pre-defined or de-facto level of certainty or probability or assurance, and/or which one or more communication link(s) and one or more modems or transceivers to utilize for such uploading or transmitting (e.g., from one or more available modems or transceivers, including for example Wi-Fi, satellite, cellular, 3G, 4G, 4G-LTE, 5G, cellular, V2X, or the like), and/or whether or not to transmit or to upload a particular data-item or data-stream over two (or more) different communication links and/or to two (or more) different recipients, and/or whether to divide and in which particular manner to divide packets that are intended for uploading across two or more modems or transceivers or communication connections which then upload or transmit them in concert or in parallel at different rates and/or at different performance characteristics (error rate, latency, delays, bandwidth, goodput, throughput, QoS parameters, or the like), and/or other communication-related decisions or determinations, that can be deep-learned over time and/or trained by an AI module, while also checking and learning whether a particular set of parameters and/or decision is sufficient to enable sufficient AI determinations beyond a pre-defined threshold level of certainty or probability or assurance. Such AI process may utilize actual data, predicted data, estimated data, raw data, processed data, diluted data, historic data, currently-measured or currently-sensed data, recently-measured or recently-sensed data, and/or a suitable combination of such data types.

In some embodiments, a local in-vehicle AI module 119, and/or a remote (external to vehicle) AI module (179, 169, 159), may continuously learn and machine-learn and improve its identification of objects and improve its decision making, by continuously analyzing the incoming data-streams that are sensed and/or transmitted or uploaded by the vehicle or from the vehicle, and then comparing the decision results or the identification results to newly-incoming or fresh data that is received in a continuous manner only 1 or 3 or 6 or 10 or N seconds later. For example, a local or in-vehicle AI module, or a remote AI module, may continuously receive a compressed or diluted stream of front-side camera video stream from a vehicle traveling on a road; may analyze 28 image frames that were received over a period of three seconds; may determine that there is an object located ahead on the road, and that the object is either a static oil stain (at 80 percent probability) or a moving cat (at 20 percent probability); then, five seconds later, as the vehicle approach the object, the front-side (or left-side) camera of the vehicle transmits closer images of the object, which allow the AI module to determine at 99 percent certainty that the object is indeed a static oil stain and not a cat, thereby training and learning for subsequent detections to better identify an oil stain or a cat or to better distinguish among objects.

Some embodiments of the invention may operate in conjunction with various types of a generally self-driving car or vehicle, autonomous car or vehicle, permanently or non-permanently driverless car or vehicle, un-manned car or vehicle or UAV, robotic car or vehicle, robot-based car or vehicle, smart car or smart vehicle, connected car or connected vehicle, specialty car or specialty vehicle, or other types of ground-based or air-based or sea-based vehicle that is capable of sensing its environment and operating (e.g., driving, flying, sailing, moving, navigating) without human input and/or that is capable of computer assisted driving and/or remote computer assisted driving and/or computer assisted operating and/or remote computer assisted operating and/or tele-operating and/or tele-driving with or without remote human intervention of any sort or local human intervention such as taking over control of the vehicle upon emergencies or unknown or low-certainty or probability situation or in pre-designed situations such as the "last mile" or off-highways or when approaching landing for UAV or within the port for unmanned ship, or upon any other need or desire.

Such vehicles may be referred to herein as "autonomous vehicle", and may utilize a variety of sensors and detectors in order to sense, detect and/or identify their surroundings and/or other data (e.g., traffic lights, traffic signs, lanes, road blocks, road obstacles, navigation paths, pedestrians); for example, cameras, image camera, video cameras, acoustic microphones, audio capturing devices, image and video capturing devices, radar sensors or devices, LIDAR sensors or devices, laser-based sensors or devices, magnetic or magnet-based sensors and devices, ultrasonic sensors, night-vision modules, Global Positioning System (GPS) units, Inertial Measurement Unit (IMU) modules, stereoscopic vision or stereo vision modules, object recognition modules, deep learning modules, machine learning modules, accelerometers, gyroscopes, compass units, odometry, computer vision modules, machine vision modules, Artificial Intelligence (AI) modules, vehicular processor, vehicular computer, dashboard processor, dashboard computer, communication devices or the like. In some embodiments, an autonomous vehicle may utilize a Bayesian simultaneous localization and mapping (SLAM) module or algorithm to fuse and process data from multiple sensors and online/offline maps; and/or detection and tracking of other moving objects (DATMO) modules; and/or real-time locating system (RTLS) beacon modules, high resolution real time maps ("HD maps") and/or other suitable modules.

In some embodiments, a vehicular processor or vehicular computer or other vehicular (in-vehicle) controller, may command one or more parts or components of the vehicle to perform certain operations, based on the sensed data and/or based on the processing of such data and/or based on insights derived from such sensed data or from remote sensors or from the infrastructure or other off-vehicle sensors or data. For example, an autonomous car travels along an urban street at day-light; a high resolution map ("HD map") is downloaded into the vehicular processor via a communication module or device; the sensors of the autonomous car collect data, and the vehicular processor determines from the captured data that the road is clear and that there are no obstacles or any other vehicles or pedestrians, and that the car is currently traveling at a constant speed of 10 kilometers per hour, and that the speed limit on this street is 30 kilometers per hour; accordingly, the vehicular processor sends a command or a signal to the driving unit(s) of the car, to gradually increase the speed of the car from 10 to 25 kilometers per hour, over a period of 6 seconds. The driving unit(s) of the car perform this command, for example, by opening or releasing a valve that injects or provides additional fuel or gas to the engine of the car, similar to the manner in which a vehicular gas pedal operates in response to a human pressing of the gas pedal, controlling the direction of the wheels similarly to the human controlling the wheels of a car and so forth.

Subsequently, as the autonomous car travels further, newly captured data or freshly acquired data enables the vehicular computer to identify a traffic light that is estimated to be located approximately 40 meters ahead, which now turns from green light to red light; and in response to such detection, the vehicular computers sends to the vehicular driving unit(s) commands instructing them (i) to stop the injection or the addition of gas or fuel to the engine, immediately or abruptly or gradually over a period of 1.5 seconds; and (ii) to avoid adding of gas and to avoid braking (slowing down) for a period of 2 seconds; and then (iii) to slow-down or brake gradually to a full stop over a period of 7 seconds. These commands may be updated on an ongoing basis, as the vehicle travels further and approaches the traffic light, and as freshly-sensed data is acquired and provides the vehicular computer new information to maintain its previous commands or to modify them. The vehicular driving unit(s) execute the commands that they received; for example, by closing a valve that thus stops injection or addition of gas or fuel to the engine, and/or causing the power supply to be reduced or cut for an electrical engine or vehicle or a hybrid vehicle, and/or by temporarily disconnecting between the engine and the tires or wheels of the vehicle by using a clutch (or similar, or equivalent) mechanism, and/or by activating the braking system of the vehicle similar to the manner in which a braking system operates when commanded to brake via a manual pressing of the brake pedal by a human driver.

Subsequently, the vehicular processor determines that in order to reach a particular destination that was pre-defined to the autonomous vehicle, in view of current road traffic conditions and in view of the current location of the vehicle, there is a need to make a left turn at the next traffic light junction. Accordingly, the vehicular processor sends commands to the vehicular steering unit(s), instructing them to steer the vehicle gradually from the right lane of the road to the left lane of the road (while signaling to the left, and while constantly checking the surroundings via sensors); and further instructing them to steer the vehicle at the next traffic light to make a 90-degrees left turn at a reduced speed of 18 kilometers per hour. The vehicular steering and driving units execute such commands; for example, by activating and later de-activating the left-turn signaling light of the vehicle, and by steering the wheels or tires of the vehicle to the left side similar to the operations that a vehicle performs in response to a manual turning of a steering wheel by a human operator.

Furthermore, the vehicle or the autonomous vehicle may be equipped with further units that enable remote driving or tele-operating of the vehicle. For example, the sensed data or a portion thereof, and/or the locally-processed data or a portion thereof, or a diluted or compressed or encoded or sparse version of such data, is transmitted periodically and/or continuously and/or intermittently and/or when needed to a remote server, over one or more communication links (e.g., cellular, Wi-Fi, satellite, V2X, or the like); the remote server receives the data, may further process the data as needed, may utilize an AI module or a remote human tele-operator to reach the relevant decisions similar to the decision described above, for example, a remote decision to increase or decrease the speed of the vehicle, a remote decision to increase or decrease the amount of gas or fuel that is supplied or provided to the engine of the vehicle, a remote decision to activate the braking system or the brakes of the car, a remote decision to temporarily disconnect between the engine and the wheels, a remote decision to steer or maneuver the vehicle to the right or to the left or in other directions, a remote decision to perform an abrupt or immediate or emergency braking or stopping, or other remote decisions performed at the tele-operator system and/or human tele-operator. Such command(s) are then transmitted from the tele-operator entity to the vehicle, via IP connection or route or path or multiplicity of communication operators and networks and hop(s), whereas the last hop from the network to/from the vehicle may be over one or more wireless communication links (e.g., cellular, Wi-Fi, satellite, V2X, V2V, V21, DSRC, or the like); and the vehicular computer receives such commands, and sends the corresponding signals or commands to the relevant vehicular units (e.g., braking unit, steering unit, driving unit, engine unit, electric unit, hydraulic unit, pneumatic unit, wheels, signaling, communications, gear, control, sensors, trailer systems, truck-related systems, bus-related systems, tractor-related systems, infotainment, power, air-conditioning, emergency systems, safety systems, or any other system in the vehicle or connected to it or associated with it or controlled from it that may be modified or managed or changed or powered either locally or remotely); and those vehicular units perform the required operations based on the received commands or signals.

It is noted that the above description is a demonstrative example of some embodiments of an autonomous vehicle or a tele-operated vehicle; and that the present invention may be utilized in conjunction with other types or mechanisms of automounts vehicles and/or tele-operated vehicles.

The examples above are non-limiting examples that demonstrate tele-operation or "autonomous vehicle" local or remote operation or tele-operation. Further, similar or additional examples may also pertain and apply to other autonomous vehicles, such as wheelchair, ship, boat, submarine, drone, UAV, or others, either as is or with the relevant adaptation of each system.

In some embodiments, the systems and methods of the present invention may reduce and/or improve the cognitive load or cognitive workload or cognitive task-load of a local human operator and/or of a remote tele-operator, which may sometimes be busy or occupied or distracted or bored or semi-conscious or even unconscious (e.g., a human driver that faints or becomes incapacitated during manual driving); and may contribute to the safety and well-being of person(s) located within the vehicle, of person(s) located nearby (e.g., in other vehicles, or pedestrians), and/or may contribute to the safety of transported goods or cargo.

In some embodiments, the system may comprise a communications-based map generator 191, able to generate a communications-based map (e.g., by utilizing data received from one or more vehicles, in conjunction with a mapping application), which indicates at least (i) a first road-segment having effective wireless communication throughput that is below a pre-defined threshold value, and (ii) a second road-segment having effective wireless communication throughput that is above said pre-defined threshold value. The communications-based map generator 191 is shown as being, for example, part of the remote server; however, it may be implemented at or within the vehicle, or at or within infrastructure elements, cellular nodes or elements, wireless communication elements or nodes, or the like.

In some embodiments, the vehicle may comprise a navigation route generator 192, able to generate or modify a navigation route for said vehicle (e.g., in in conjunction with a conventional route guidance application or navigation application), by taking into account at least: an estimated level of wireless communication availability at different route segments; or, by taking into account at least: (i) an estimated level of wireless communication availability at different route segments, and also (ii) one or more constraints regarding safety requirements for passengers of said vehicle; or, by generating or modifying a navigation route for said vehicle to include road-segments having wireless communication availability that is above a pre-defined threshold value; or, configured to increase safety of travel of said vehicle which is a tele-operated vehicle, by generating or modifying a navigation route for said vehicle to include road-segments in which tele-operation of said vehicle is estimated to be successful beyond a—pre-defined threshold level; or, configured to perform other route modification or route determination operations in view of safety considerations, number or age or gender or characteristics of driver and/or of passengers, the current and/or momentary and/or predicted and/or estimated level or quality of wireless communication(s) that is available for the vehicle to upload sensed data, the current and/or momentary and/or predicted and/or estimated level or quality of video and/or images and/or audio and/or other data that is sensed by vehicular sensor(s) and is uploaded to a remote AI unit for remote processing.

It is noted that in some embodiments, a "remote" AI unit or a "remote" processor, relative to a particular vehicle, need not necessarily be far away in geographical distance relative to said vehicle; but rather, may be any suitable AI unit or processor that is external to that vehicle and/or that is not physically connected to said vehicle and/or that is not physically touching said vehicle; such as, for example, a "remote" AI unit or processor that is actually located in a smart road sign which is currently located three meters away from the current location of the vehicle; or a "remote" AI unit or processor that is actually located at an eNodeB element which happens to be 24 meters away from the vehicle as it passes near it; or a "remote" AI unit or processor which is actually located within a second vehicle that happens to be 6 meters away from said particular vehicle; or other such "remote" AI units or processors that may be cloud-based and physically distant from the vehicle, or may be actually nearby to that particular vehicle at that particular point in time. In some embodiments, the "remote" AI unit or processor is fixed or non-mobile or non-moving (temporarily, or fixedly); whereas, in other embodiments, the "remote" AI unit or processor may be moving (e.g., within a second vehicle nearby; within a drone flying above or nearby; or the like).

Figure 2:
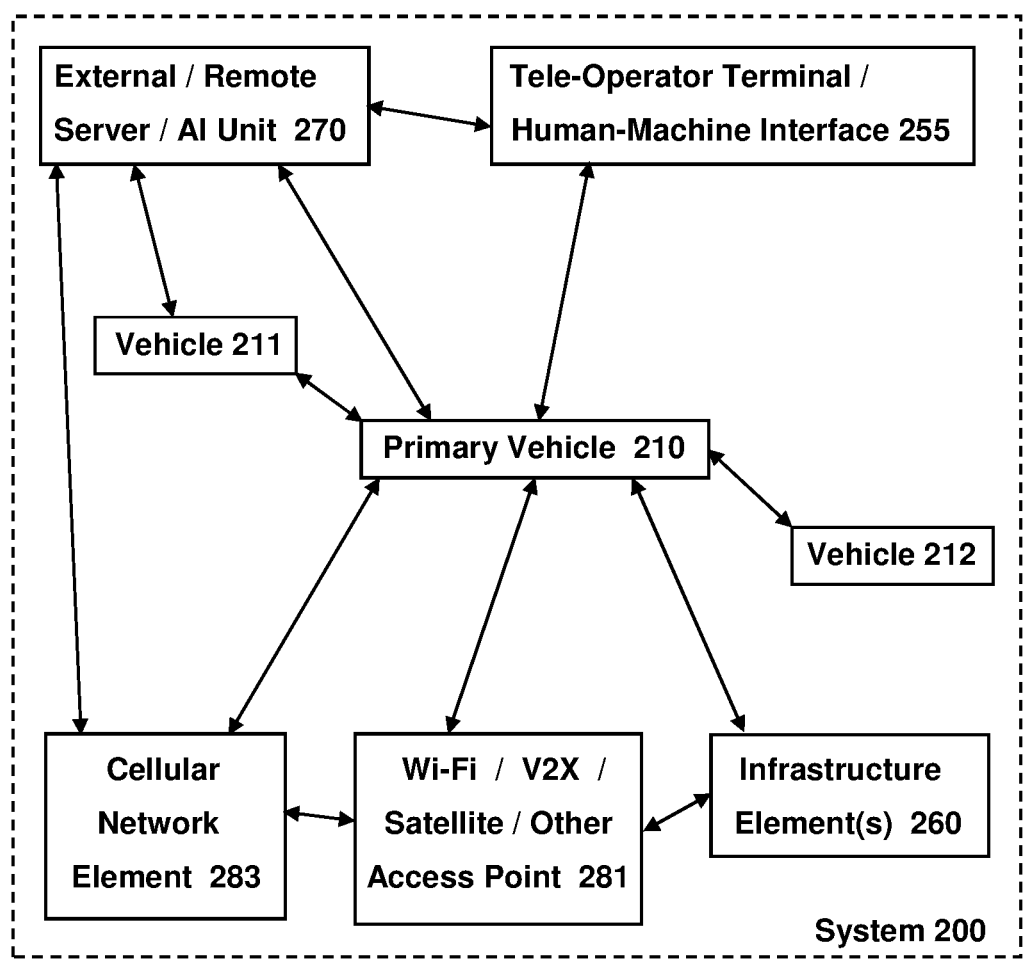
FIG. 2 is a schematic illustration of another system, in accordance with some demonstrative embodiments of the present invention.

Reference is made to FIG. 2, which is a schematic illustration of a system 200, in accordance with some demonstrative embodiments of the present invention. System 200 may be a demonstrative implementation of system 100 of FIG. 1; and the components of system 200 may include one or more, or some, or all, of the components or modules shown in FIG. 1.

System 200 may include one or more vehicles, for example, a vehicle 210 (which may be referred to as a "primary" vehicle) and other vehicles 211 and 212 (which may be referred to as "secondary" vehicles). The vehicles 210-212 may be travelling along the same route or on different routes, or on the same road or road-segment or in different roads, or in the same direction or in opposite directions or in perpendicular directions or in other non-identical directions. Other devices, entities and/or users may also appear or may be nearby or may be part of system 200; such as pedestrians, cyclists, motorcyclists, scooters, animals, moving or non-moving objects such as balls, potholes, or others; road hazards, flying drones, self-driving vehicles, autonomous vehicles, tele-operated vehicles, electric vehicles, or the like; and some of these may also be referred to as "secondary vehicles", such as the pedestrians or motorcycles or cyclists, if they are operably connected to the primary vehicle, in an ad-hoc way or in other way, or if they are equipped with the ability to send and/or receive wireless communication signals to the primary vehicle and/or to a remote server and/or to other entities or units of system 200.

Each one of the units in system 200, may comprise one or more transceivers able to send and receive data and/or packets; as well as an AI unit or AI processor or AI module, able to process (partially or fully) some or all of the data that was sensed or collected by the primary vehicle 210.

An external or remote server/AI unit 270 may be in communication (directly, or indirectly) with one or more of the vehicles 210-212, and particularly with the primary vehicle 210. The external or remote server/AI unit 270 is external to each one of the vehicles 210-212, and is separated from each one of the vehicles 210-212; and may be remote in distance (e.g., may be located 100 or 5,000 meters away from the vehicles 210-212), or may be extremely remote in distance (e.g., may be implemented as a remote cloud-computing server that is located in another city or another state or another country and is accessible via IP communication network including cellular communication links); or may be physically nearby relative to the vehicles 210-212 or to some of them. Each vehicle 210-212 may upload (or stream in real time or in near real time, or via delayed streaming or subsequent streaming, or via file upload or via data upload) or otherwise transmit to the external or remote server/AI unit 270, data collected by or sensed by one or more sensors of such vehicle; and such data may be processed by the external or remote server/AI unit 270, which in turn may provide tele-operating commands to one or more of the vehicles 210-212.

A Tele-Operator Terminal/Human-Machine Interface (HMI) 255 for the human tele-operator may also be in communication (directly, or indirectly) with one or more of the vehicles, such as with the primary vehicle 210; and may enable a human tele-operator or a machine-based tele-operator to remotely interact, intervene, operate or drive or control the primary vehicle 210 or otherwise affect its operation via remote commands or remote suggestions or remotely-obtained data or remotely-generated commands. The HMI units of the Tele-Operator Terminal/HMI 255 may include, for example, touch screen, screen, joystick, touch-pad, computer mouse, steering wheel, pedals, gear shift device, microphone, speakers, Augmented Reality (AR) or Virtual Reality (VR) equipment (e.g., wearable device, helmet, headgear, glasses, googles, gloves, or the like), haptic elements, tactile elements, gloves, other wearable elements, lights, alarms, or the like.

Optionally, the Tele-Operator Terminal/HMI 255 may be in communication with (or may be associated with) the external or remote server/AI unit 270; for example, if one or more conditions hold true, the external or remote server/AI unit 270 may transfer the tele-operation control of vehicle 210 to the human tele-operator, or may take away the tele-operation control of vehicle 210 from the human tele-operator, or may provide suggested or recommended tele-operation commands for the human tele-operator to further approve or reject, or the like.

A cellular network element 283, such as eNodeB or gNodeB or another 3G or 4G or LTE or 4G-LTE or 5G network element, or a cellular tower or cellular base station or a fixed cellular transceiver, may further be in communication with the vehicle 210 (and optionally with other vehicles, and/or with other units of system 200); may receive from the vehicle 210 sensed data collected by the vehicular sensors of vehicle 210; may optionally perform AI processing of such data, locally within the cellular network element 283 and/or remotely by sending data and/or queries to the external or remote server/AI unit 270; and may then transmit tele-operating commands or tele-operating suggestions or other tele-operated data to vehicle 210.

Similarly, an Access Point (AP) 281, which may be a Wi-Fi/V2X/Satellite-based/Other (e.g., fixed or ad hoc) access point or communications node, which may comprise one or more transceivers of the same types or of different types, may further be in communication with the vehicle 210 (and optionally with other vehicles, and/or with other units of system 200); may receive from the vehicle 210 sensed data collected by the vehicular sensors of vehicle 210; may optionally perform AI processing of such data, locally within the AP 281 and/or remotely by sending data and/or queries to the external or remote server/AI unit 270; and may then transmit tele-operating commands or tele-operating suggestions or other tele-operated data to vehicle 210.

Similarly, one or more road-side or in-road or over-the-road infrastructure element(s) 260, may further be in communication with the vehicle 210; such infrastructure element(s) 260 may be, for example, a traffic light, a traffic sign, a road sign, a bridge, a tunnel, an Internet of Things (IoT) device or an IP-connected sensor, or the like; they may receive from the vehicle 210 sensed data collected by the vehicular sensors of vehicle 210; may perform AI processing of such data, locally within the infrastructure element(s) 260 and/or remotely by sending data and/or queries to the external or remote server/AI unit 270; and may then transmit tele-operating commands to vehicle 210.

Optionally, other vehicles 211-212 may be in communication with the primary vehicle 210, directly and/or indirectly, such as via one or more ad-hoc networks, DSRC, V2V, peer-to-peer communication, or other protocols and topologies; may receive from vehicle 210 sensed data; may perform some or all of the AI processing of such data, locally within such vehicles 211-212 and/or remotely by sending data and/or queries to the external or remote server/AI unit 270; and may then transmit tele-operating commands to vehicle 210.

In some embodiments, optionally, vehicles 211-212 may further assist the primary vehicle 210 in uploading and/or streaming data that was sensed or collected by vehicular sensors of vehicle 210, to the external or remote server/AI unit 270 and/or to other units of system 200. For example, vehicle 210 may capture video via a vehicular video camera, and may transmit the captured video and/or the real-time streaming video to nearby vehicle 211 over a direct ad hoc Wi-Fi link between these two vehicles; and the vehicle 211 may relay or send or transmit or upload or stream such video to the external or remote server/AI unit 270 or another processor such as may be used for or in or by the Tele-Operator Terminal/HMI 255, over a 4G-LTE communication link or over a 5G communication link, together with an indication that this data was actually sensed by (and belongs to) the primary vehicle 210 and not to the relaying vehicle 211, and that tele-operating commands that are based on this data should be transmitted to the primary vehicle 210 (e.g., directly, or indirectly via the relaying vehicle 211 while such commands include an indication that they are directed to the primary vehicle 210).

In some embodiments, optionally, the secondary vehicle 211 itself, may also utilize some or all of the data that it is relaying from vehicle 210 to another unit; for example, if such data includes information about a road hazard or an environmental condition (e.g., fog, snow, or the like) that affects the primary vehicle 210 and is also estimated to affect the secondary vehicle(s) such as vehicle 211.

In some embodiments, the data (e.g., sensed data that is uploaded from the vehicle, and/or processed data or commands that is downloaded or sent towards the vehicle) may be transmitted via broadcast or unicast or multicast, or via a single one-to-one communication link, or via a single point-to-point communication link, or via a one-to-many communication link or channel, or via a set or group or batch of several one-to-one communication links or of several point-to-point communication links; such as between (or among) the primary vehicle and any subset of the secondary vehicles and/or infrastructure elements and/or the external or remote server or AI unit, in either direction (upstream and/or downstream; uplink and/or downlink; upload and/or download); using half-duplex or using full-duplex communication; optionally with an additional control channel or messaging channel or feedback channel, or without such additional channel. Some embodiments may utilize IP connectivity without necessarily knowing the address of a specific destination, or may allow sending of data from one sender to multiple receivers or a group of receivers which may be listening-in on the same IP network and without necessarily knowing in advance or at the time of the transmission whether and/or how many recipient units are actually listening-in to such transmission or broadcast or multicast or upload or uplink Some of the transmitted information may be relevant to more than one destination device (or recipient, or vehicle, or road user), and therefore some embodiments may utilize broadcasting and/or multicasting as being more efficient and/or having lower delay in delivering the data to more than a threshold number of IP destinations or recipients or information consumers or data processors.

Figure 3:
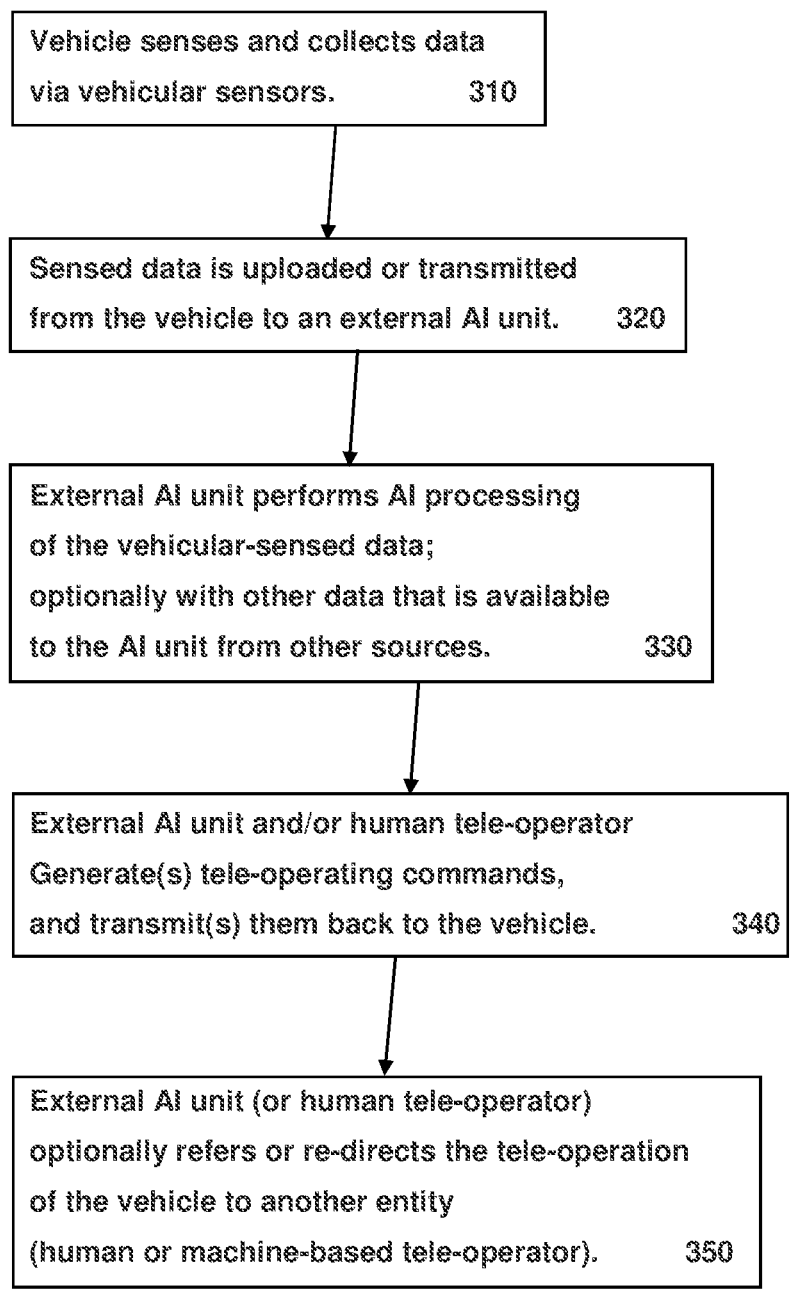
FIG. 3 is a flow-chart of a method in accordance with some demonstrative embodiments of the present invention.

Reference is made to FIG. 3, which is a flow-chart of a method in accordance with some demonstrative embodiments of the present invention. The method may be implemented by one or more, or some, or all, of the units of system 100 or system 200, or by other suitable systems or devices.

In some embodiments, a primary vehicle senses and collects data via vehicular sensors (block 310). The sensed data is uploaded or transmitted to an external AI unit (block 320), via one or more wireless communication links, and particularly via a bonded (or aggregated, or multi-link) virtual communication link comprised of multiple wireless IP communication links served by multiple vehicular transceivers, such that each transceiver is able to transmit or upload or stream, in parallel, some of the total packets that need to be uploaded to a certain IP destination address, and such that the recipient unit utilizes an assembly engine or re-assembly engine which re-assembles the packets that are incoming from multiple wireless links into an ordered and correct data-stream.

The external AI unit performs AI processing of the vehicular-sensed data (block 330), optionally in combination with other data that is available to the AI unit from other sources (e.g., weather data, seismic data, traffic data, or the like).

The external AI unit (and/or the human tele-operator using the tele-operator terminal/HMI 255) generates one or more tele-operating commands, and transmits them back to the vehicle (block 340); optionally with a dis-engagement command, or with a signal that the vehicle is now switched to being tele-operated by the external AI unit. The signals sent to the vehicle may represent or may carry, for example: (a) tele-operating commands, (b) and/or direct tele-operating commands that can be immediately executed by the specific recipient vehicle without further conversion or re-formatting or translation, and/or (c) indirect tele-operating commands that the specific recipient vehicle then translates or converts or re-formats into specific executable in-vehicle commands, and/or (d) input to the vehicle that is expressed as conditional statements and/or conditional commands and/or by using Boolean operators or Boolean logic (e.g., "if you can come to a complete stop within 3 seconds then do so, and if not then change the lane to the right lane and reduce your speed from 40 to 20 mph"), and/or (e) input to the vehicle that comprises data sense and/or processed and/or collected and/or obtained by the remote AI unit or the remote tele-operator, such that the vehicle's systems may utilize such additional data in order to reach an in-vehicle decision (e.g., weather data, vehicular traffic data, seismic data, data from law enforcement systems, data that was recently or previously sensed or uploaded or up-streamed by other vehicle(s) and/or by infrastructure elements and/or by IP-connected sensors or devices), and/or (f) control data or messaging data or feedback data or other meta-data (e.g., time-stamp/date-stamp, a unique identifier of the vehicle that this transmission is intended to, a unique identifier of the remote AI unit or the remote tele-operator that provided or transmitted the data, an indication whether the sent data is a strict command that must be followed or whether it is only an option or a suggestion or a recommendation that the recipient vehicle may or may not accept or reject or modify, or the like), and/or other types of data or signals.

Additionally or alternatively, the external AI unit or the human tele-operator using the tele-operator terminal/HMI 255 may refer or relay or switch or re-direct or allocate or submit the tele-operation of the vehicle to another human tele-operator and/or to another machine-based tele-operator (block 350), which in turn proceeds to provide tele-operating commands to the vehicle, or which in turn proceeds to further relay or re-direct to another entity.

Figure 4:
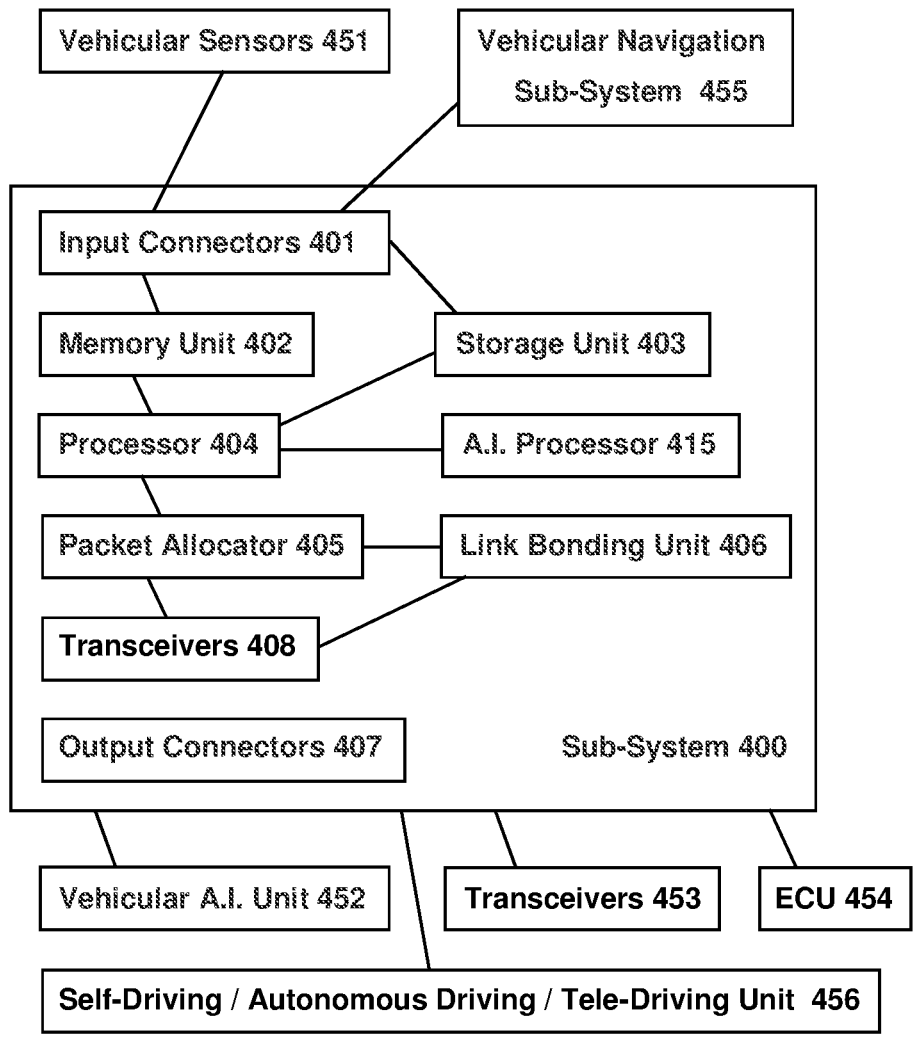
FIG. 4 is a block-diagram illustration of a sub-system, in accordance with some demonstrative embodiments of the present invention.

Reference is made to FIG. 4, which is a block-diagram illustration of a sub-system 400, in accordance with some demonstrative embodiments of the present invention. Sub-system 400 may be part of a vehicle, or may be within a vehicle, or may be a vehicular add-on unit or may be mounted on or within a vehicle, or may be embedded or integrated in a vehicle or within a vehicle or under or beneath a vehicle, and/or may be implemented as a vehicular component or as part of a vehicular dashboard or vehicular communication unit; or may be otherwise associated with a vehicle, or may be used by a user or driver or passenger of a vehicle. Sub-system 400 may be part of any vehicle of System 100 or of System 200 described above, or of other devices or apparatuses in accordance with the present invention.

Sub-system 400 may comprise multiple input connectors 401 or sockets or ports or outlets or inlets or male-parts or female-parts, or other input interface, enabling the sub-system 400 to connect mechanically and/or physically and/or electronically and/or via a wire or cable and/or via other types of connection, to one or more vehicular sensors 451 (e.g., cameras, imagers, video cameras, microphones, LIDAR sensors, RADAR sensors, proximity sensors, temperature sensors, humidity sensors, or the like); and enabling the sub-system 400 to receive data from such vehicular sensors, as well as from other vehicular units 452 (e.g., vehicular computer, vehicular processor, self-driving processor, autonomous driving processor; electric control unit (ECU) 454 or electric control module, or electronic control unit or module; vehicular mapping system, vehicular navigation sub-system 455, vehicular route-guidance system; Global Positioning Unit (GPS) element or system; or the like).

Optionally, a memory unit 402 (e.g., Flash memory, Random Access Memory (RAM), or the like) and/or a storage unit 403 (e.g., Hash memory, solid state drive (SSD), hard disk drive (HDD), or the like) may store such data that was sensed by (or collected from) the vehicular sensors.

Optionally, a processor 404 may partially or fully process such data, or may re-format or convert it, or may encode or re-encode or trans-code it; particularly for the purposes of efficiently uploading such data to an external or remote recipient over one or more wireless communication links.

Sub-system 400 may optionally comprise also an AI processor 415, which may perform some or all of the AI processing of the sensed data and/or other known conditions (e.g., vehicle's velocity, location, or the like) in order to generate commands and/or signals that are then performed or utilized by a self-driving or autonomous driving unit of the vehicle. In other embodiments, such AI processor need not necessarily be comprised in sub-system 400, but rather, may be connected to it, or may be part of a vehicular AI unit 452 which is coupled to (or operably associated with) the sub-system 400.

A packet allocator 405 may allocate packets that are intended for transmission to the remote or external entity, to one or more transceivers; such that each transceiver sends out or transmits a different batch or set or group of the total packets that are intended to be uploaded or sent out. Optionally, a link bonding unit 406 may define, determine, configure and/or modify, in a dynamic manner, which communication link(s) to utilize and/or which transceivers to utilize for such uplink transmission, thereby generating an ad hoc or a continuous bonded channel or bonded multi-link connection.

The packet allocator 405 and/or the link bonding unit 406 may operate in cooperation with such multiple transceivers, which may be transceivers 408 that are integral or internal or integrated or embedded parts of the sub-system 400, and/or which may be transceivers 453 which are external to the sub-system 400 yet accessible to it via output connectors 407 or sockets or cables or wires (or other output interface) which may transfer such data or packet to the suitable transceivers for transmitting.

In some embodiments, optionally, sub-system 400 may be connected to or associated with or coupled to, or may be in communication with, a self-driving/autonomous driving/tele-operation unit 456 of the vehicle; such as, in order to receive data from such unit, and/or in order to transfer to such unit locally-generated commands and/or remotely-generated commands for operating or tele-operating of the vehicle.

Some embodiments of the present invention may comprise, or may utilize, one or more components, units, devices, systems, and/or methods that are disclosed in U.S. Pat. No. 7,948,933, titled "Remote transmission system", which is hereby incorporated by reference in its entirety.

Some embodiments of the present invention may comprise, or may utilize, one or more components, units, devices, systems, and/or methods that are disclosed in U.S. Pat. No. 9,826,565, titled "Broadband transmitter, broadband receiver, and methods thereof", which is hereby incorporated by reference in its entirety.

Some embodiments of the present invention may comprise, or may utilize, one or more components, units, devices, systems, and/or methods that are disclosed in PCT international application number PCT/IL2018/050484, titled "Device, system, and method of pre-processing and data delivery for multi-link communications and for media content", published as international publication number WO 2018/203336 A1, which is hereby incorporated by reference in its entirety.

Some embodiments of the present invention may comprise, or may utilize, one or more components, units, devices, systems, and/or methods that are disclosed in PCT international application number PCT/IL2017/051331, titled "Device, system, and method of wireless multiple-link vehicular communication", published as international publication number WO 2018/211488 A1, which is hereby incorporated by reference in its entirety.

In some embodiments, a system comprises: a vehicular processor that is associated with a vehicular Artificial Intelligence (AI) unit, that is configured: (a) to receive inputs from a plurality of vehicular sensors of a vehicle, (b) to locally process within said vehicle at least a first portion of said inputs, (c) to wirelessly transmit via a vehicular wireless transmitter at least a second portion of said inputs to a remote tele-driving processor located externally to said vehicle, (d) to wirelessly receive, via a vehicular wireless receiver from said remote tele-driving processor, a remotely-computed processing result that is received from a remote node, and (e) to implement a vehicular operating command based on said remotely-computed processing result, via at least one of: (i) an autonomous driving unit of said vehicle, (ii) a tele-driving unit of said vehicle, (iii) a vehicular driving processor, (iv) a vehicular commands translator unit.

In some embodiments, the vehicular processor that is associated with said vehicular AI unit is to transfer said vehicular operating command to an autonomous driving unit of said vehicle which then autonomously operates said vehicle based on said vehicular operating command. In some embodiments, the vehicular processor that is associated with said vehicular AI unit is to transfer said vehicular operating command to a tele-driving unit of said vehicle which then autonomously operates said vehicle based on said vehicular operating command.

In some embodiments, the system comprises: a vehicular autonomous driving unit, configured to autonomously operate said vehicle based on both (I) inputs generated locally within said vehicle by said AI unit, and (II) said vehicular operating command received from said remote tele-driving processor.

In some embodiments, the system comprises: a dynamic encoder to dynamically encode said second portion of said inputs into a reduced-size representation prior to transmission to said remote tele-driving processor. In some embodiments, said data-sharing determination unit operates by taking into account at least a level of certainty of said vehicular AI unit in a locally-computed processing result that was computed locally in said vehicle by said vehicular AI unit.

In some embodiments, the system comprises: a communication channels allocator, to allocate a first set of packets having data from a first vehicular sensor, for wireless transmission via a first set of one or more vehicular wireless transmitters, and to allocate a second set of packets having data from a second vehicular sensor, for wireless transmission via a second set of one or more vehicular wireless transmitters.

In some embodiments, the communication channels allocator is to dynamically determine which one or more vehicular transmitters are to be included in the first set of transmitters, and which one or more vehicular transmitters are to be included in the second set of transmitters.

In some embodiments, the communication channels allocator is to dynamically determine, which one or more vehicular transmitters are to be included in the first set of transmitters, and which one or more vehicular transmitters are to be included in the second set of transmitters; wherein the first set of transmitters and the second set of transmitters include at least one particular transmitter that is common to both of said sets.

In some embodiments, the system comprises: a communication channels allocator, to allocate a first wireless communication channel for wireless transmission of data collected by a first vehicular sensor to a first remote processor for processing at said first remote processor, and to allocate a second wireless communication channel for wireless transmission of data from a second vehicular sensor to a second remote processor for processing at said second remote processor.

In some embodiments, the system comprises: a vehicular multiple tele-operators handling unit, (A) to wirelessly receive a first tele-driving command from a first tele-driving processor, (B) to wirelessly receive a second tele-driving command from a second tele-driving processor, (C) to detect an inconsistency between the first and second tele-driving commands, wherein said inconsistency comprises at least one of: contradiction, mismatch, duplication, adverse effects, contradictory results; and (D) to determine, based on pre-defined rules or by using the vehicular AI unit, which tele-operating command to discard and which tele-operating command to execute in said vehicle.

In some embodiments, said remote tele-driving processor is a moving tele-driving processor that is located in a secondary vehicle; wherein the vehicular AI unit is to wirelessly transmit said second portion of inputs to the tele-driving processor located in said secondary vehicle; wherein the vehicular AI unit is to wirelessly receive from said secondary vehicle the remotely-computed processing result; wherein the vehicular AI unit is to generate said vehicular operating command based on said remotely-computed processing result that was wirelessly received from said secondary vehicle.

In some embodiments, said remote tele-driving processor is a tele-driving processor that is external to said vehicle and is located in a non-mobile traffic infrastructure element; wherein the vehicular AI unit is to wirelessly transmit said second portion of inputs to the tele-driving processor located in said non-mobile traffic infrastructure element; wherein the vehicular AI unit is to wirelessly receive from said non-mobile traffic infrastructure element the externally-computed processing result; wherein the vehicular AI unit is to generate said vehicular operating command based on said remotely-computed processing result that was wirelessly received from said non-mobile traffic infrastructure element.

In some embodiments, the system comprises: a communications-based map generator, to generate a communications-based map which indicates at least (i) a first road-segment having effective wireless communication throughput that is below a pre-defined threshold value, and (ii) a second road-segment having effective wireless communication throughput that is above said pre-defined threshold value.

In some embodiments, the system comprises: a navigation route generator to generate or to modify a navigation route for said vehicle, by taking into account at least: an estimated level of wireless communication service availability at different route segments.

In some embodiments, the system comprises: a navigation route generator to generate or to modify a navigation route for said vehicle, by taking into account at least: (i) an estimated level of wireless communication availability at different route segments, and also (ii) one or more constraints regarding safety requirements for passengers of said vehicle.

In some embodiments, the system comprises: a navigation route generator, to increase safety of travel of said vehicle which is a self-driving vehicle, by generating or modifying a navigation route for said vehicle to include road-segments having wireless communication availability that is above a pre-defined threshold value.

In some embodiments, the system comprises: a navigation route generator, to increase safety of travel of said vehicle which supports being tele-operated, by generating or modifying a navigation route for said vehicle to include road-segments in which tele-operation of said vehicle is estimated to be successful.

In some embodiments, a self-driving unit of said vehicle is to dynamically modify one or more driving parameters of said vehicle, based on availability of wireless communications at one or more particular route segments.

In some embodiments, a self-driving unit of said vehicle is to dynamically modify one or more driving parameters of said vehicle, based on estimated success level of remote tele-operation of said vehicle based on tele-operating commands received from a remote machine-based or human tele-operator or from a remote AI processing unit.

In some embodiments, a self-driving unit of said vehicle is to dynamically reduce a driving speed of said vehicle or to dynamically increase a distance from a nearby vehicle, based on reduced availability of wireless communications at a particular route segment.

In some embodiments, a self-driving unit of said vehicle is to dynamically reduce a driving speed of said vehicle or to dynamically increase a distance from a nearby vehicle, based on a reduced estimated level of success of remote tele-operation of said vehicle at a particular route segment.

In some embodiments, a self-driving unit of said vehicle is to dynamically reduce a driving speed of said vehicle or to dynamically increase a distance from a nearby vehicle, at a particular route segment, based on reduced throughput of wireless video upload from said vehicle to a remote recipient that includes a remote tele-operation terminal or a remote AI processing unit.

In some embodiments, an external AI module, that is located externally to said vehicle, is to take over the driving of said vehicle instead of said vehicular AI unit or instead of an in-vehicle human driver.

In some embodiments, an external AI module, that is located externally to said vehicle, is to take over the driving of said vehicle instead of said vehicular AI unit or instead of an in-vehicle human driver; wherein said external AI module is to selectively refer the tele-operation of said vehicle to a remote human tele-operator.

In some embodiments, an external AI module, that is located externally to said vehicle, is to take over the driving of said vehicle instead of said vehicular AI unit or instead of an in-vehicle human driver; wherein said external AI module is to adjust a level of confidence in remote tele-operating operations, based on (i) quality of wireless communications received from said vehicle, and (ii) quality of sensed data that is sensed by vehicular sensors of said vehicle and is uploaded to said external AI module.

In some embodiments, data sensed by a single vehicular sensor of said vehicle, is transmitted via a bonded communication uplink to an external AI unit that is located externally to said vehicle; wherein packets that correspond to data sensed by said single sensor of said vehicle, are uploaded from said vehicle by: (i) allocating a first set of packets to be uploaded via a first wireless communication link by a first wireless transmitter associated with said vehicle, and (ii) allocating a second set of packets to be uploaded via a second wireless communication link by a second wireless transmitter associated with said vehicle.

In some embodiments, said bonded communication uplink is utilized by said vehicle to increase a confidence level of one or more remote AI modules that generate tele-operation commands for said vehicle based on data sensed by said vehicle and uploaded to said one or more remote AI modules.

In some embodiments, said bonded communication uplink is dynamically constructed by said a link bonding unit associated with said vehicle, by selecting two or more of any combination of: a cellular communication link, a Wi-Fi communication link, a V2X communication link, a satellite-based communication link, a Direct Short-Range Communication (DSRC) communication link.

In some embodiments, the vehicular transmitter or a transmitter associated with the vehicle, is to upload, to an external AI module that is external to said vehicle, data sensed by one or more vehicular sensors of said vehicle; wherein the vehicular AI unit is to receive from said external AI module, a batch of two or more conditional tele-operating commands for said vehicle, and to perform a first tele-operating command if a first condition holds true at a particular level of confidence, and to perform a second tele-operating command if a second condition holds true at a particular level of confidence.

In some embodiments, a wireless transmitter associated with said vehicle is to upload, to an external AI module that is external to said vehicle, data sensed by one or more vehicular sensors of said vehicle; wherein the vehicular AI unit is to receive from said external AI module, an authorization to perform in-vehicle processing of said sensed data and to avoid waiting for an incoming tele-operation command.

In some embodiments, a transmitter associated with said vehicle is to upload, to an external AI module that is external to said vehicle, data sensed by one or more vehicular sensors of said vehicle, wherein said data is at least partially processed within said vehicle to enable effective upload of said data to said external AI module based on effective wireless communication resources that are currently available to said vehicle using a multiplicity of wireless transceivers.

In some embodiments, a transmitter associated with said vehicle is to upload, to an external AI module that is external to said vehicle, data sensed by one or more vehicular sensors of said vehicle; wherein if a quality indicator of effective wireless communication resources that are currently available to said vehicle for said upload, is greater than a pre-defined threshold value, then the external AI module is to determine a first level of certainty for a tele-operating command generated by the external AI module; wherein if the quality indicator of effective wireless communication resources that are currently available to said vehicle for said upload, is smaller than said pre-defined threshold value, then the external AI module is to determine a second, reduced, level of certainty for said tele-operating command generated by the external AI module.

In some embodiments, a transmitter associated with said vehicle is to upload, to an external AI module that is external to said vehicle, data sensed by one or more vehicular sensors of said vehicle; wherein said transmitter comprises two or more transmitting units; wherein said upload is performed over a bonded wireless communication link which comprises two or more wireless communications links that are served concurrently by two or more, respective, wireless transmitting units that operate and upload different packets in parallel to each other.

In some embodiments, two or more transmitters that are associated with said vehicle are to upload, to an external AI module that is external to said vehicle, data sensed by one or more vehicular sensors of said vehicle; wherein a first transmitter is to wirelessly transmit, to said external AI module, data sensed by a first vehicular sensor of said vehicle; wherein a second transmitter is to concurrently wirelessly transmit, to said external AI module, data sensed by a second vehicular sensor of said vehicle.

In some embodiments, two or more transmitter that are associated with said vehicle are to upload, to an external AI module that is external to said vehicle, data sensed by a single vehicular sensor of said vehicle; wherein a first transmitter is to wirelessly transmit, to said external AI module, a first batch of packets of data sensed by said single vehicular sensor of said vehicle; wherein a second transmitter is to concurrently wirelessly transmit, to said external AI module, a second batch of packets of data sensed by said single vehicular sensor of said vehicle.

In some embodiments, a transmitter associated with said vehicle is to upload, to an external AI module that is external to said vehicle, data sensed by one or more vehicular sensors of said vehicle; wherein said upload is performed over a bonded wireless communication link which comprises an aggregation of two or more wireless communications links that are served by two or more, respectively, wireless transmitters associated with said vehicle.

In some embodiments, said bonded wireless communication uplink is dynamically constructed by a link bonding unit associated with said vehicle, by selecting two or more communication links in any combination out of: a cellular communication link, a Wi-Fi communication link, a satellite-based communication link, a V2X communication link, a Direct Short-Range Communication (DSRC) communication link; wherein the two or more communication links operate concurrently and upload different packets in parallel to each other.

In some embodiments, the vehicular AI unit of said vehicle is part of a multiple-peers network of AI units, which are distributed among multiple vehicles and at least one AI unit that is external to all vehicles; wherein said multiple-peers network of AI units provides AI tele-operating commands to at least one vehicle of said multiple-peers network of AI units.

In some embodiments, the vehicular AI unit of said vehicle operates (I) to perform AI processing of data sensed by sensors of another vehicle, and (II) to reach an AI-based tele-operating command that is suitable for said other vehicle, (III) to transmit said tele-operating command to said other vehicle.

In some embodiments, commands that are sent from a remote tele-operation terminal to said vehicular processor of said vehicles, are transmitted over a multiplicity of wireless communication transceivers that are associated with said vehicular processor.

In some embodiments, said vehicular processor (i) operates to identify two or more repeated tele-operating commands incoming via the same transceivers or via different transceivers, and (ii) executes a first command of said repeated tele-operating command, and (iii) discards one or more other commands of the repeated tele-operating commands.

In some embodiments, two or more wireless transceivers, that are associated with said vehicle, and which have different momentary performance characteristics, are concurrently utilized to upload data from said vehicle to a remote tele-operation terminal or to download data from said remote tele-operation terminal to said vehicle.

In some embodiments, the two or more wireless transceivers, that are associated with said vehicle, have different momentary performance characteristics of at least one of: throughput, good-put, effective upload bandwidth, effective download bandwidth, latency, delays, error rate, erroneous packet rate, missing packets rate.

In some embodiments, a link bonding unit that is associated with said vehicle, operates to increase safety or accuracy or certainty level of remotely-generated tele-operation commands that are directed to said vehicle, by bonding together and allocating packets for upload across a multiplicity of wireless communication transceivers that are available to said vehicle.

In some embodiments, at least a portion of packets, that represent data sensed by one or more vehicular sensors, is uploaded from said vehicle to a remote tele-operation terminal or to a remote AI module, via a transceiver of a smartphone or a tablet of a non-driver passenger of said vehicle. In some embodiments, said system comprises said vehicle.

In some embodiments, an apparatus includes a cellular infrastructure element which comprises: (a) a cellular receiver to wirelessly receive from a vehicular transmitter of a vehicle packets corresponding to inputs of one or more vehicular sensors; (b) a data processor integral to said cellular infrastructure element, to process said packets and to generate a vehicular operational command; (c) a wireless transmitter to wirelessly transmit to a wireless receiver of said vehicle a signal indicating said vehicular operational command generated by said cellular infrastructure element. In some embodiments, the cellular infrastructure element comprises at least one of: a cellular base station, a cellular transmission tower, an eNodeB element, a gNodeB element, a fixed non-moving cellular transceiver node, a cellular edge infrastructure element, an edge computing element.

In some embodiments, a device includes a Wi-Fi access point which comprises: (a) a Wi-Fi receiver to wirelessly receive from a vehicular transmitter of a vehicle packets corresponding to inputs of one or more vehicular sensors; (b) a data processor integral to said Wi-Fi access point, to process said packets and to generate a vehicular operational command; (c) a wireless transmitter to wirelessly transmit to a wireless receiver of said vehicle a signal indicating said a vehicular operational command generated by said Wi-Fi access point. In some embodiments, said Wi-Fi access point is to locally process a first portion of said packets, and to forward a second portion of said packets for remote processing by a remote tele-driving processor or a remote tele-operation terminal.

In some embodiments, a device includes a satellite-based access point which comprises: (a) a wireless receiver to wirelessly receive from a vehicular transmitter of a vehicle packets corresponding to inputs of one or more vehicular sensors; (b) a data processor integral to said satellite-based access point, to process said packets and to generate a vehicular operational command; (c) a satellite-based wireless transmitter to wirelessly transmit to a wireless receiver of said vehicle a signal indicating said a vehicular operational command generated by said satellite-based access point. In some embodiments, said satellite-based access point is to locally process a first portion of said packets, and to forward a second portion of said packets for remote processing by a remote tele-driving processor or a remote tele-operation terminal.

In some embodiments, a device includes a DSRC or V2X access point which comprises: (a) a wireless receiver to wirelessly receive from a vehicular transmitter of a vehicle packets corresponding to inputs of one or more vehicular sensors; (b) a data processor integral to said access point, to process said packets and to generate a vehicular operational command; (c) a wireless transmitter to wirelessly transmit to a wireless receiver of said vehicle a signal indicating said a vehicular operational command generated by said satellite-based access point. In some embodiments, said DSRC or V2X access point is to locally process a first portion of said packets, and to forward a second portion of said packets for remote processing by a remote tele-driving processor or a remote tele-operation terminal.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
a vehicular processor that is configured:
to receive inputs from a plurality of vehicular sensors of a vehicle,
to locally process within said vehicle at least a first portion of said inputs,
to wirelessly transmit via a vehicular wireless transmitter at least a second portion of said inputs to a remote tele-driving processor located externally to said vehicle,
to wirelessly receive, via a vehicular wireless receiver from said remote tele-driving processor, a remotely-computed processing result that is received from a remote node, and
to implement a vehicular operating command based on said remotely-computed processing result, via at least one of: (i) an autonomous driving unit of said vehicle, (ii) a tele-driving unit of said vehicle, (iii) a vehicular driving processor, (iv) a vehicular commands translator unit;
wherein the system is configured to adjust levels of confidence of remote tele-operating operations, that are transmitted to said vehicle, based cumulatively on (i) quality of wireless communications received from said vehicle, and (ii) quality of sensed data that is sensed by vehicular sensors of said vehicle and is uploaded to said remote tele-driving processor.

2. The system of claim 1,
wherein the vehicular processor is to transfer said vehicular operating command to an autonomous driving unit of said vehicle which then autonomously operates said vehicle based on said vehicular operating command.

3. The system of claim 1,
wherein the vehicular processor is to transfer said vehicular operating command to a tele-driving unit of said vehicle which then autonomously operates said vehicle based on said vehicular operating command.

4. The system of claim 1, further comprising:
a vehicular autonomous driving unit, configured to autonomously operate said vehicle based on both (I) inputs generated locally within said vehicle by said vehicular processor, and (II) said vehicular operating command received from said remote tele-driving processor.

5. The system of claim 1, comprising:
a dynamic encoder to dynamically encode said second portion of said inputs into a reduced-size representation prior to transmission to said remote tele-driving processor.

6. The system of claim 1, comprising:
a data-sharing determination unit to dynamically determine which portions of said inputs to transmit to said remote tele-driving processor and which other portions of said inputs to process locally in said vehicular processor.

7. The system of claim 1, comprising:
a data-sharing determination unit to dynamically determine which portions of said inputs to transmit to said remote tele-driving processor and which other portions of said inputs to process locally in said vehicular processor;
wherein said data-sharing determination unit operates by taking into account at least a level of certainty of said vehicular processor in a locally-computed processing result that was computed locally in said vehicle by said vehicular processor.

8. The system of claim 1, comprising:
a communication channels allocator,
to allocate a first set of packets having data from a first vehicular sensor, for wireless transmission via a first set of one or more vehicular wireless transmitters, and
to allocate a second set of packets having data from a second vehicular sensor, for wireless transmission via a second set of one or more vehicular wireless transmitters.

9. The system of claim 8,
wherein the communication channels allocator is to dynamically determine which one or more vehicular transmitters are to be included in the first set of transmitters, and which one or more vehicular transmitters are to be included in the second set of transmitters.

10. The system of claim 8,
wherein the communication channels allocator is to dynamically determine, which one or more vehicular transmitters are to be included in the first set of transmitters, and which one or more vehicular transmitters are to be included in the second set of transmitters;
wherein the first set of transmitters and the second set of transmitters include at least one particular transmitter that is common to both of said sets.

11. The system of claim 1, comprising:
a communication channels allocator,
to allocate a first wireless communication channel for wireless transmission of data collected by a first vehicular sensor to a first remote processor for processing at said first remote processor, and to allocate a second wireless communication channel for wireless transmission of data from a second vehicular sensor to a second remote processor for processing at said second remote processor.

12. The system of claim 1, comprising:
a vehicular multiple tele-operators handling unit,
to wirelessly receive a first tele-driving command from a first tele-driving processor,
to wirelessly receive a second tele-driving command from a second tele-driving processor,
to detect an inconsistency between the first and second tele-driving commands, wherein said inconsistency comprises at least one of: contradiction, mismatch, duplication, adverse effects, contradictory results;
and to determine, based on pre-defined rules or by using the vehicular processor, which tele-operating command to discard and which tele-operating command to execute in said vehicle.

13. The system of claim 1,
wherein said remote tele-driving processor is a moving tele-driving processor that is located in a secondary vehicle;
wherein the vehicular processor is to wirelessly transmit said second portion of inputs to the tele-driving processor located in said secondary vehicle;
wherein the vehicular processor is to wirelessly receive from said secondary vehicle the remotely-computed processing result;
wherein the vehicular processor is to generate said vehicular operating command based on said remotely-computed processing result that was wirelessly received from said secondary vehicle.

14. The system of claim 1,
wherein said remote tele-driving processor is a tele-driving processor that is external to said vehicle and is located in a non-mobile traffic infrastructure element;
wherein the vehicular processor is to wirelessly transmit said second portion of inputs to the tele-driving processor located in said non-mobile traffic infrastructure element;
wherein the vehicular processor is to wirelessly receive from said non-mobile traffic infrastructure element the externally-computed processing result;
wherein the vehicular processor is to generate said vehicular operating command based on said remotely-computed processing result that was wirelessly received from said non-mobile traffic infrastructure element.

15. The system of claim 1, further comprising:
a communications-based map generator, to generate a communications-based map which indicates at least (i) a first road-segment having effective wireless communication throughput that is below a pre-defined threshold value, and (ii) a second road-segment having effective wireless communication throughput that is above said pre-defined threshold value.

16. The system of claim 1, further comprising:
a navigation route generator to generate or to modify a navigation route for said vehicle, by taking into account at least: an estimated level of wireless communication service availability at different route segments.

17. The system of claim 1, further comprising:
a navigation route generator to generate or to modify a navigation route for said vehicle, by taking into account at least: (i) an estimated level of wireless communication availability at different route segments, and also (ii) one or more constraints regarding safety requirements for passengers of said vehicle.

18. The system of claim 1, further comprising:
a navigation route generator, to increase safety of travel of said vehicle which is a self-driving vehicle, by generating or modifying a navigation route for said vehicle to include road-segments having wireless communication availability that is above a pre-defined threshold value.

19. The system of claim 1,
a navigation route generator, to increase safety of travel of said vehicle which supports being tele-operated, by generating or modifying a navigation route for said vehicle to include road-segments in which tele-operation of said vehicle is estimated to be successful.

20. The system of claim 1,
wherein a self-driving unit of said vehicle is to dynamically modify one or more driving parameters of said vehicle, based on availability of wireless communications at one or more particular route segments.

21. The system of claim 1,
wherein a self-driving unit of said vehicle is to dynamically modify one or more driving parameters of said vehicle, based on estimated success level of remote tele-operation of said vehicle based on tele-operating commands received from a remote machine-based or human tele-operator or from a remote AI processing unit.

22. The system of claim 1,
wherein a self-driving unit of said vehicle is to dynamically reduce a driving speed of said vehicle or to dynamically increase a distance from a nearby vehicle, based on reduced availability of wireless communications at a particular route segment.

23. The system of claim 1,
wherein a self-driving unit of said vehicle is to dynamically reduce a driving speed of said vehicle or to dynamically increase a distance from a nearby vehicle, based on a reduced estimated level of success of remote tele-operation of said vehicle at a particular route segment.

24. The system of claim 1,
wherein a self-driving unit of said vehicle is to dynamically reduce a driving speed of said vehicle or to dynamically increase a distance from a nearby vehicle, at a particular route segment, based on reduced throughput of wireless video upload from said vehicle to a remote recipient that includes a remote tele-operation terminal or a remote AI processing unit.

25. The system of claim 1,
wherein an external AI module, that is located externally to said vehicle, is to take over the driving of said vehicle instead of said vehicular processor or instead of an in-vehicle human driver.

26. The system of claim 1,
wherein an external AI module, that is located externally to said vehicle, is to take over the driving of said vehicle instead of said vehicular processor or instead of an in-vehicle human driver;
wherein said external AI module is to selectively refer the tele-operation of said vehicle to a remote human tele-operator.

27. The system of claim 1,
wherein data sensed by a single vehicular sensor of said vehicle, is transmitted via a bonded communication uplink to an external AI unit that is located externally to said vehicle, wherein packets that correspond to data sensed by said single sensor of said vehicle, are uploaded from said vehicle by: (i) allocating a first set of packets to be uploaded via a first wireless communication link by a first wireless transmitter associated with said vehicle, and (ii) allocating a second set of packets to be uploaded via a second wireless communication link by a second wireless transmitter associated with said vehicle.

28. The system of claim 27,
wherein said bonded communication uplink is utilized by said vehicle to increase a confidence level of one or more remote AI modules that generate tele-operation commands for said vehicle based on data sensed by said vehicle and uploaded to said one or more remote AI modules.

29. The system of claim 27,
wherein said bonded communication uplink is dynamically constructed by said a link bonding unit associated with said vehicle, by selecting two or more of any combination of:
a cellular communication link,
a Wi-Fi communication link,
a V2X communication link,
a satellite-based communication link,
a Direct Short-Range Communication (DSRC) communication link.

30. The system of claim 1,
wherein a wireless transmitter associated with said vehicle is to upload, to an external AI module that is external to said vehicle, data sensed by one or more vehicular sensors of said vehicle;
wherein the vehicular AI unit is to receive from said external AI module, an authorization to perform in-vehicle processing of said sensed data and to avoid waiting for an incoming tele-operation command.

31. The system of claim 1,
wherein a transmitter associated with said vehicle is to upload, to an external AI module that is external to said vehicle, data sensed by one or more vehicular sensors of said vehicle, wherein said data is at least partially processed within said vehicle to enable effective upload of said data to said external AI module based on effective wireless communication resources that are currently available to said vehicle using a multiplicity of wireless transceivers.

32. The system of claim 1,
wherein a transmitter associated with said vehicle is to upload, to an external AI module that is external to said vehicle, data sensed by one or more vehicular sensors of said vehicle;
wherein if a quality indicator of effective wireless communication resources that are currently available to said vehicle for said upload, is greater than a pre-defined threshold value, then the external AI module is to determine a first level of certainty for a tele-operating command generated by the external AI module;
wherein if the quality indicator of effective wireless communication resources that are currently available to said vehicle for said upload, is smaller than said pre-defined threshold value, then the external AI module is to determine a second, reduced, level of certainty for said tele-operating command generated by the external AI module.

33. The system of claim 1,
wherein a transmitter associated with said vehicle is to upload, to an external AI module that is external to said vehicle, data sensed by one or more vehicular sensors of said vehicle,
wherein said transmitter comprises two or more transmitting units,
wherein said upload is performed over a bonded wireless communication link which comprises two or more wireless communications links that are served concurrently by two or more, respective, wireless transmitting units that operate and upload different packets in parallel to each other.

34. The system of claim 1,
wherein two or more transmitters that are associated with said vehicle are to upload, to an external AI module that is external to said vehicle, data sensed by one or more vehicular sensors of said vehicle;
wherein a first transmitter is to wirelessly transmit, to said external AI module, data sensed by a first vehicular sensor of said vehicle;
wherein a second transmitter is to concurrently wirelessly transmit, to said external AI module, data sensed by a second vehicular sensor of said vehicle.

35. The system of claim 1,
wherein two or more transmitter that are associated with said vehicle are to upload, to an external AI module that is external to said vehicle, data sensed by a single vehicular sensor of said vehicle;
wherein a first transmitter is to wirelessly transmit, to said external AI module, a first batch of packets of data sensed by said single vehicular sensor of said vehicle;
wherein a second transmitter is to concurrently wirelessly transmit, to said external AI module, a second batch of packets of data sensed by said single vehicular sensor of said vehicle.

36. The system of claim 1,
wherein a transmitter associated with said vehicle is to upload, to an external AI module that is external to said vehicle, data sensed by one or more vehicular sensors of said vehicle,
wherein said upload is performed over a bonded wireless communication link which comprises an aggregation of two or more wireless communications links that are served by two or more, respectively, wireless transmitters associated with said vehicle.

37. The system of claim 36,
wherein said bonded wireless communication uplink is dynamically constructed by a link bonding unit associated with said vehicle, by selecting two or more communication links in any combination out of:
a cellular communication link,
a Wi-Fi communication link,
a satellite-based communication link,
a V2X communication link,
a Direct Short-Range Communication (DSRC) communication link;
wherein the two or more communication links operate concurrently and upload different packets in parallel to each other.

38. The system of claim 1,
comprising a vehicular AI unit in said vehicle that is part of a multiple-peers network of AI units, which are distributed among multiple vehicles and at least one AI unit that is external to all vehicles;

wherein said multiple-peers network of AI units provides AI tele-operating commands to at least one vehicle of said multiple-peers network of AI units.

39. The system of claim 1,
wherein a vehicular AI unit of said vehicle operates (I) to perform AI processing of data sensed by sensors of another vehicle, and (II) to reach an AI-based tele-operating command that is suitable for said other vehicle, (III) to transmit said tele-operating command to said other vehicle.

40. The system of claim 1,
wherein commands that are sent from a remote tele-operation terminal to said vehicular processor of said vehicle, are transmitted over a multiplicity of wireless communication transceivers that are associated with said vehicular processor.

41. The system of claim 40,
wherein said vehicular processor (i) operates to identify two or more repeated tele-operating commands incoming via the same transceivers or via different transceivers, and (ii) executes a first command of said repeated tele-operating command, and (iii) discards one or more other commands of the repeated tele-operating commands.

42. The system of claim 1,
wherein two or more wireless transceivers, that are associated with said vehicle, and which have different momentary performance characteristics, are concurrently utilized to upload data from said vehicle to a remote tele-operation terminal or to download data from said remote tele-operation terminal to said vehicle.

43. The system of claim 1,
wherein two or more wireless transceivers, that are associated with said vehicle, have different momentary performance characteristics of at least one of: throughput, good-put, effective upload bandwidth, effective download bandwidth, latency, delays, error rate, erroneous packet rate, missing packets rate.

44. The system of claim 1,
wherein a link bonding unit that is associated with said vehicle, operates to increase safety or accuracy or certainty level of remotely-generated tele-operation commands that are directed to said vehicle, by bonding together and allocating packets for upload across a multiplicity of wireless communication transceivers that are available to said vehicle.

45. The system of claim 1,
wherein at least a portion of packets, that represent data sensed by one or more vehicular sensors, is uploaded from said vehicle to a remote tele-operation terminal or to a remote AI module, via a transceiver of a smartphone or a tablet of a non-driver passenger of said vehicle.

46. The system of claim 1,
wherein said system comprises said vehicle.

* * * * *